US010718154B2

(12) United States Patent
Galstian

(10) Patent No.: US 10,718,154 B2
(45) Date of Patent: Jul. 21, 2020

(54) LC MODULATOR DEVICES BASED ON NON-UNIFORM ELECTRODE STRUCTURES

(71) Applicant: UNIVERSITE LAVAL, Quebec (CA)

(72) Inventor: Tigran Galstian, Québec (CA)

(73) Assignee: UNIVERSITÉ LAVAL, Quebec (CA)

( * ) Notice: Subject to any disclaimer, the term of this patent is extended or adjusted under 35 U.S.C. 154(b) by 0 days.

(21) Appl. No.: 15/433,221

(22) Filed: Feb. 15, 2017

(65) Prior Publication Data

US 2017/0218686 A1    Aug. 3, 2017

Related U.S. Application Data

(63) Continuation of application No. PCT/CA2015/050808, filed on Aug. 24, 2015.

(Continued)

(51) Int. Cl.
*G02F 1/137* (2006.01)
*E06B 3/67* (2006.01)
(Continued)

(52) U.S. Cl.
CPC ........... *E06B 3/6722* (2013.01); *E06B 9/24* (2013.01); *G02F 1/132* (2013.01); *G02F 1/13306* (2013.01); *G02F 1/13363* (2013.01); *G02F 1/13439* (2013.01); *G02F 1/13718* (2013.01); *G02F 1/133345* (2013.01); *G02F 1/133711* (2013.01); *G02F 1/133784* (2013.01); *G02F 1/134309* (2013.01); *E06B 2009/2417* (2013.01); *E06B 2009/2464* (2013.01); *G02F 2001/133638* (2013.01);

*G02F 2201/08* (2013.01); *G02F 2201/343* (2013.01); *G02F 2202/06* (2013.01); *G02F 2203/07* (2013.01);
(Continued)

(58) Field of Classification Search
CPC ........... G02F 1/13718; G02F 2201/343; G02F 1/1396; G02F 2001/13756; G02F 1/13471; G02F 1/13476; G02F 1/1347; E06B 2009/2464; E06B 9/24
See application file for complete search history.

(56) References Cited

U.S. PATENT DOCUMENTS 6,674,504 B1  1/2004  Li et al.
8,081,272 B2  12/2011  Komitov et al.
(Continued)

OTHER PUBLICATIONS

Cheng-Chang Li et al., Bistable cholesteric liquid crystal light shutter with multielectrode driving, Applied Optics, Aug. 1, 2014 Optical Society of America, vol. 53,Nr.22,pp. E33-E37.
(Continued)

*Primary Examiner* — Michael H Caley
*Assistant Examiner* — Mariam Qureshi
(74) *Attorney, Agent, or Firm* — Anglehart et al.

(57) ABSTRACT

Liquid crystal modulator optical devices and more specifically shutters and smart windows are presented. The liquid crystal modulator devices are characterized by a reduced polymer content which is eliminated from the material composition of the liquid crystal layer and characterized by non-uniform electrode structures in the liquid crystal structure configured to generate spatially non-uniform electric fields and therefore non-uniform molecular reorientation of liquid crystal molecules. This arrangement advantageously makes light scattering electrically controllable.

16 Claims, 24 Drawing Sheets

Related U.S. Application Data

(60) Provisional application No. 62/040,995, filed on Aug. 22, 2014.

(51) Int. Cl.

| | | |
|---|---|---|
| *E06B 9/24* | (2006.01) | |
| *G02F 1/1343* | (2006.01) | |
| *G02F 1/13* | (2006.01) | |
| *G02F 1/133* | (2006.01) | |
| *G02F 1/1333* | (2006.01) | |
| *G02F 1/13363* | (2006.01) | |
| *G02F 1/1337* | (2006.01) | |

(52) U.S. Cl.
CPC ...... *G02F 2413/01* (2013.01); *G02F 2413/05* (2013.01)

(56) References Cited

U.S. PATENT DOCUMENTS

| | | | |
|---|---|---|---|
| 2001/0035932 A1* | 11/2001 | Suzuki | G02F 1/141 349/169 |
| 2002/0033442 A1* | 3/2002 | Toko | G02F 1/133753 250/214.1 |
| 2005/0001797 A1* | 1/2005 | Miller, IV | G09G 3/3629 345/87 |
| 2007/0024950 A1* | 2/2007 | Verhaegh | G02F 1/172 359/291 |
| 2008/0030635 A1* | 2/2008 | Chien | G02F 1/13718 349/33 |
| 2011/0096253 A1 | 4/2011 | Zhang et al. | |
| 2011/0134349 A1* | 6/2011 | Wu | G02F 1/13781 349/34 |
| 2011/0317092 A1* | 12/2011 | Park | G02F 1/134363 349/61 |
| 2012/0140133 A1 | 6/2012 | Choi et al. | |
| 2012/0242918 A1* | 9/2012 | Valyukh | G02F 1/13718 349/33 |
| 2012/0242924 A1* | 9/2012 | Galstian | G02F 1/134309 349/54 |
| 2013/0250197 A1* | 9/2013 | Khodadad | G02F 1/13306 349/33 |
| 2014/0132909 A1* | 5/2014 | Wardhana | G02F 1/13392 349/155 |
| 2017/0068134 A1* | 3/2017 | Yadin | G02F 1/134309 |

OTHER PUBLICATIONS

Mitov M. et al., Cholesteric Liquid Crystalline Materials Reflecting More Than 50% of Unpolarized Incident Light Intensity, Liquid Crystals, Feb. 1, 2007 Taylor & Francis vol.34,Nr.2,pp. 183-193.
PCT/CA2015/050808 IPRP1.
PCT/CA2015/050808 ISR.
PCT/CA2015/050808 search strategy.
Rumi et al.: "Non-Uniform Helix Unwinding of Cholesteric Liquid Crystals in Cells with Interdigitated Electrodes", CHEMPHYSCHEM, Special Issue: Liquid Crystals, vol. 15, No. Issue 7, May 19, 2014 (May 19, 2014), pp. 1311-1322.
EP15834167.7 office action dated Mar. 27, 2018.
EP15834167.7 search report dated Mar. 27, 2018.
Karen Allahverdyan et al, "Accelerating the Cholesteric Helix Restoring by a Dual Frequency Compound", Molecular Crystals and Liquid Crystals, UK, (Aug. 3, 2012), vol. 560, No. 1, doi:10.1080/15421406.2012.661960, ISSN 1542-1406, pp. 35-48, XP055458757.
Pankaj Kumar et al, "Advanced bistable cholesteric light shutter with dual frequency nematic liquid crystals", Optical Materials Express, (Aug. 1, 2012), vol. 2, No. 8, doi:10.1364/OME.2.001121, ISSN 2159-3930, p. 1121, XP055459552.

\* cited by examiner

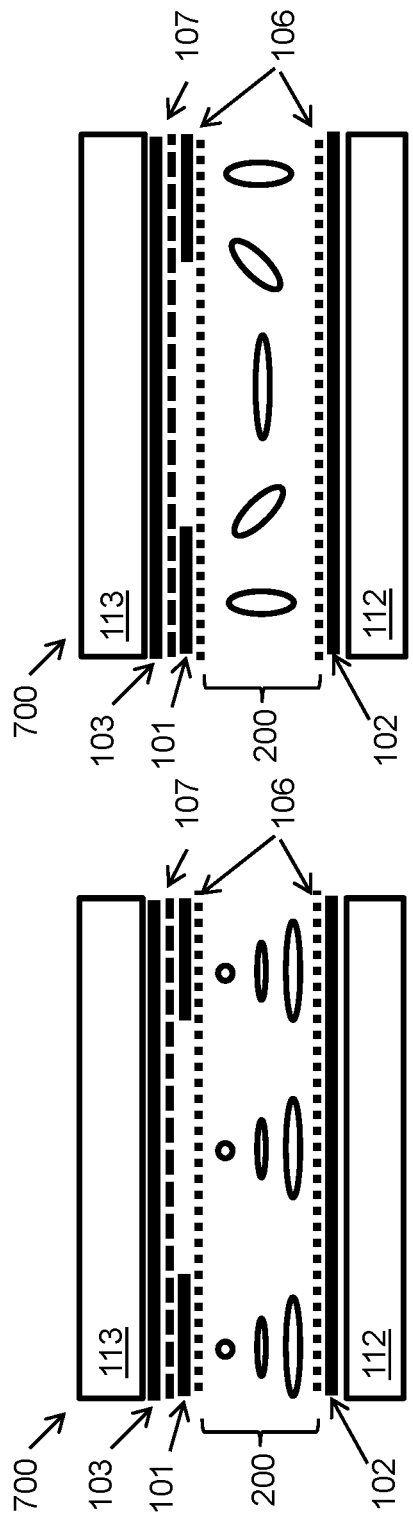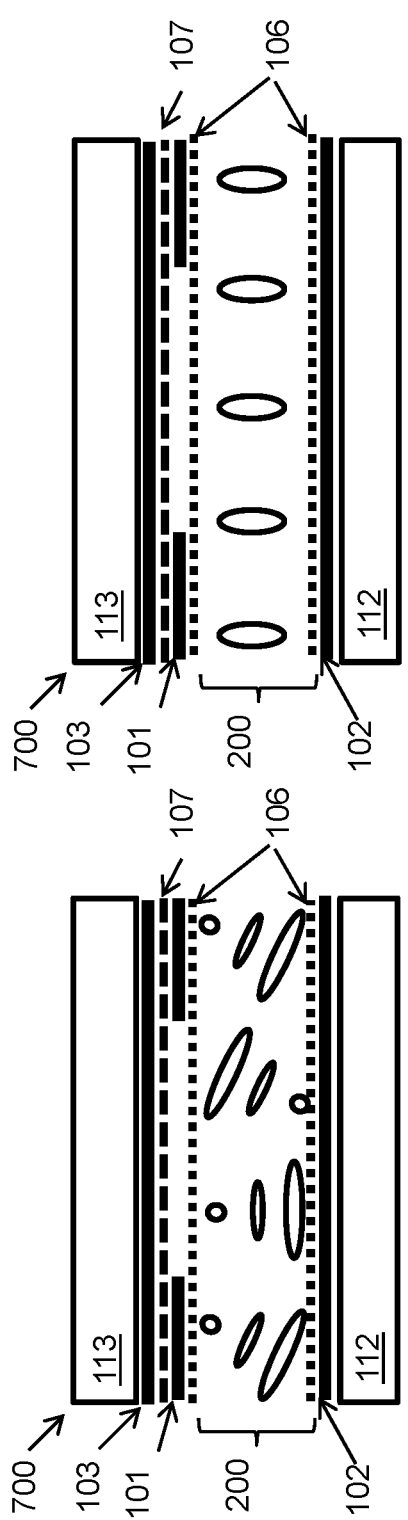

LC MODULATOR DEVICES BASED ON NON-UNIFORM ELECTRODE STRUCTURES

TECHNICAL FIELD

The invention relates generally to liquid crystal modulator optical devices and more specifically to shutters and smart windows, and methods for manufacturing thereof.

BACKGROUND

Light modulation devices have many applications in photonics (telecommunication, imaging, energy conservation, etc.). The modulation may be activated by means of various mechanisms based on: mechanical movement, deformation, photochromism, charged particle motion, electro optic modulation in interferential or polarimetric schemes and finally by using electrically controllable light transmission.

The last approach is particularly interesting for shutter (imaging), energy saving (so called "smart windows"), privacy (image destroying) and color control applications. In addition, electrically controllable systems that are operated without polarizers are gaining in cost reduction, energy efficiency and reliability.

One of the traditional methods of obtaining electro optic modulation of light transmission is based on the use of Polymer Dispersed Liquid Crystals (PDLCs), as described in Doane, Chien, Yang and Bos chapters 1, 4, 5, 11, 12, 13 of "Liquid Crystals in Complex Geometries", edited by GP Crawford & S. Zumer (Taylor & Frances, London. 1996). With reference to FIGS. 1A and 1B, such materials are typically composed from 25% of liquid crystal dispersed (in the form of droplets) into a solid polymer matrix (75%). While being efficient for privacy window applications, there are however several drawbacks with this approach: most important of them being that the light scattering provided is dominantly forward scattering and thus is not very efficient for energy flux control. Another drawback is the presence of the polymer matrix of the PDLC which contributes to yellowing of such a modulated pane, when used for example as a window exposed to sunlight. The high operating voltages and the angular dependent scattering (haze) are other significant drawbacks.

Electric modulation of light was demonstrated also in so called Polymer Stabilized Liquid Crystal (PSLC) compounds by R. A. M. Hikmet in "Electrically Induced Light Scattering from Anisotropic Gels", J. Appl. Phys. 68, pp. 4406, 1990, where the polymer content is significantly reduced, typically to 5%, while the remaining mass (95%) is composed of liquid crystal. FIG. 2 shows an example of such a structure with a polymer concentration gradient, going from almost 100% of liquid crystal (right bottom corner) to almost 100% of polymer (left top corner), T. Galstian, "Liquid Crystals, Polymers, and Electrically Tunable Optical Components", 19 Apr. 2010, SPIE Newsroom.

The light scattering may be controlled by the appropriate choice of material parameters. For example, in L. Komitov, L-C. Chien, S. H. Kim, "Method of Fabricating Electro-Optical Devices with Polymer Stabilized Liquid Crystal", U.S. Pat. No. 8,081,272, Dec. 20, 2011 and M. Mitov, N. Dessaud, "Cholesteric Liquid Crystalline Materials Reflecting more than 50% of Unpolarized Incident Light Intensity", Liq. Cryst. 34, no. 2, pp. 183-193, 2007, cholesteric (or "helical") liquid crystal material was used in the above mentioned PSLC configuration to obtain preferential back scattering of light. While the back scattering is increased compared to the use of simple, so called "nematic", liquid crystals, the main problem of photo chemical stability (yellowing in sunlight) remains. However, it is difficult to eliminate the polymer content since its presence is an important factor particularly for obtaining modulators of high efficiency.

Natural light may be presented as the sum of two orthogonal polarizations (two crossed linear polarizations or two opposed circular polarizations). The use of cholesteric liquid crystal material typically ensures the reflection (or back scattering) of only (mainly) one circular polarization, while the opposed circular polarization is not affected by the material. That is why, various "polymer matrix programming" methods have been developed to provide the reflection of both types of circular polarizations, see M. Mitov, N. Dessaud, "Cholesteric Liquid Crystalline Materials Reflecting more than 50% of Unpolarized Incident Light Intensity", Liq. Cryst. 34, no. 2, pp. 183-193, 2007.

Further efforts were devoted by J.-P. Bédard-Arcand, T. Galstian in, "Self Organization of Liquid-Crystal and Reactive-Mesogen into 2D Surface Stabilized Structures," Macromolecules, 44, 344-348, 2011, to the development of light modulators with less volumetric polymer content, by creating so called Surface Polymer Stabilized Liquid Crystal (S-PSLC) material systems. However, the complexity of manufacturing: mixing the liquid crystal with a polymerizable monomer composition, its handling, dispersion, polymerization, stability, etc. still remain a problem.

In some applications, such as for windows, providing a controllable reflection of 50% of incident light is practical to reduce the amount of light entering a window, even if control over substantially 100% of the light could be preferable. Being able to switch from reflection to transmission (either with diffusion or with transparency, or both), is desirable. Cholesteric Liquid Crystal (CLC) materials provide the ability to reflect light, however, the electric field strength required to change the state of the liquid crystal to remove the reflection can be nearly prohibitive.

SUMMARY

Applicant has discovered that the helically ordered state of CLC materials that provides reflection can be changed to be more transmissive under favorable conditions of electric field strength by using non-uniform electric fields instead of uniform electric fields. Electric field lines that are not perpendicular to the planes of the substrates containing the CLC material help change the helical structure of the CLC towards a homeotropic structure using lower field strengths than for electric field lines that are perpendicular. For example and without limitation, control voltages can be lowered from over 100V to less than 10V for cells of similar properties.

Applicant has discovered that uniform electric fields can be applied following a non-uniform electric field to complete a transition and/or maintain a transmissive state of the CLC material. Electrode structures for providing non-uniform and uniform electric fields are disclosed herein.

Applicant has discovered that dual frequency CLC materials can be controlled to change from a reflective state to a transmissive state at one frequency and from a transmissive state back to a reflective state at another frequency.

Liquid crystal modulator optical devices, and more specifically shutters and smart windows, are presented along with their methods of manufacture. Shutters can reflect light and/or cause light to be diffused, like a frosted window, in which case they are also called "privacy windows". Smart windows typically control energy flow, although color temperature control for windows and variable lighting devices or light projectors are also applications. The liquid crystal modulator devices are characterized by reduced polymer content in the material composition of the liquid crystal layer and characterized by non-uniform electrode structures in the LC structure configured to generate spatially non-uniform electric fields and therefore non-uniform molecular reorientation of LC molecules. This arrangement provides electrically controllable light scattering.

In accordance with one aspect of the proposed solution there is provided a liquid crystal modulator for modulating incident light, the modulator comprising: first and second polymeric layers providing electrical isolation; first and second transparent electrode layers sandwiching said first and second polymeric layers therebetween, at least one of said transparent electrodes being non-uniform and a remaining transparent electrode being uniform; and Liquid Crystal (LC) material sandwiched between a said polymeric layers, said liquid crystal material having a non-uniform LC molecular director orientation.

In accordance with another aspect of the proposed solution there is provided a modulator wherein said first and second layers (for example, polymeric layers) are preferably rub-free, said first electrode is non-uniform, said second electrode is uniform, said LC material is cholesteric LC material, said modulator further comprising: a third uniform electrode outside said first electrode and a transparent isolation layer between said first and second electrodes.

In accordance with a further aspect of the proposed solution there is provided a liquid crystal modulator for modulating incident light, the modulator preferably comprising: first and second layers (for example, polymeric layers) providing alignment and/or electrical isolation; first and second transparent electrode layers sandwiching said first and second layers therebetween, at least one of said transparent electrodes being non-uniform and a remaining transparent electrode being uniform; and Liquid Crystal (LC) material sandwiched between said layers, said liquid crystal material having a non-uniform LC molecular director orientation, wherein said LC material is a cholesteric LC material of a first helicity and said LC layer comprises a polymeric matrix set in the presence of said cholesteric LC material of a second opposite helicity.

In accordance with yet another aspect of the proposed solution there is provided a modulator further comprising a temperature gradient structure providing a chirp in the pitch of the helical structure of said cholesteric LC material. Also, the cell may be filled by a "dual frequency" cholesteric liquid crystal.

In accordance with yet another aspect of the proposed solution there is provided a method of driving the liquid crystal modulator where a sequence of electrical excitation is applied to transit from uniform reflecting state into non uniform scattering state with the help of non-uniform electrodes and using relatively low driving voltages; followed by the application of voltage between two outer electrodes to obtain finally a uniform transparent state.

In accordance with yet another aspect of the proposed solution there is provided a liquid crystal modulator with non-uniform reorientation state that can increase lights divergence and be maintained by a train of pulses and used as privacy window (destroying the image quality of transmitted light).

In accordance with yet another aspect of the proposed solution there is provided a liquid crystal modulator with non-uniform electrode layer that contains multiple independent electrodes which may be controlled by multiple electrical signals with different amplitudes, phases or frequencies.

In accordance with yet another aspect of the proposed solution there is provided a liquid crystal modulator with multiple liquid crystal cells having different helicitities to reflect the orthogonal polarization components of the incident light as well as different resonant reflection wavelengths to provide more spectral independent control.

BRIEF DESCRIPTION OF THE DRAWINGS

The proposed solution will be better understood by way of the following detailed description of embodiments with reference to the appended drawings, in which:

FIGS. 8A, 8B, 8C and 8D are schematic diagrams illustrating different LC orientational states in accordance with the third implementation of the second embodiment of the proposed solution;

DETAILED DESCRIPTION

In accordance with one embodiment of the proposed solution, polymer content is substantially removed from the material composition of an LC layer itself and a non-uniform electrode structure is employed configured to generate a spatially non-uniform molecular reorientation of the liquid crystal material to scatter light in an electrically controllable manner.

Figure 1:
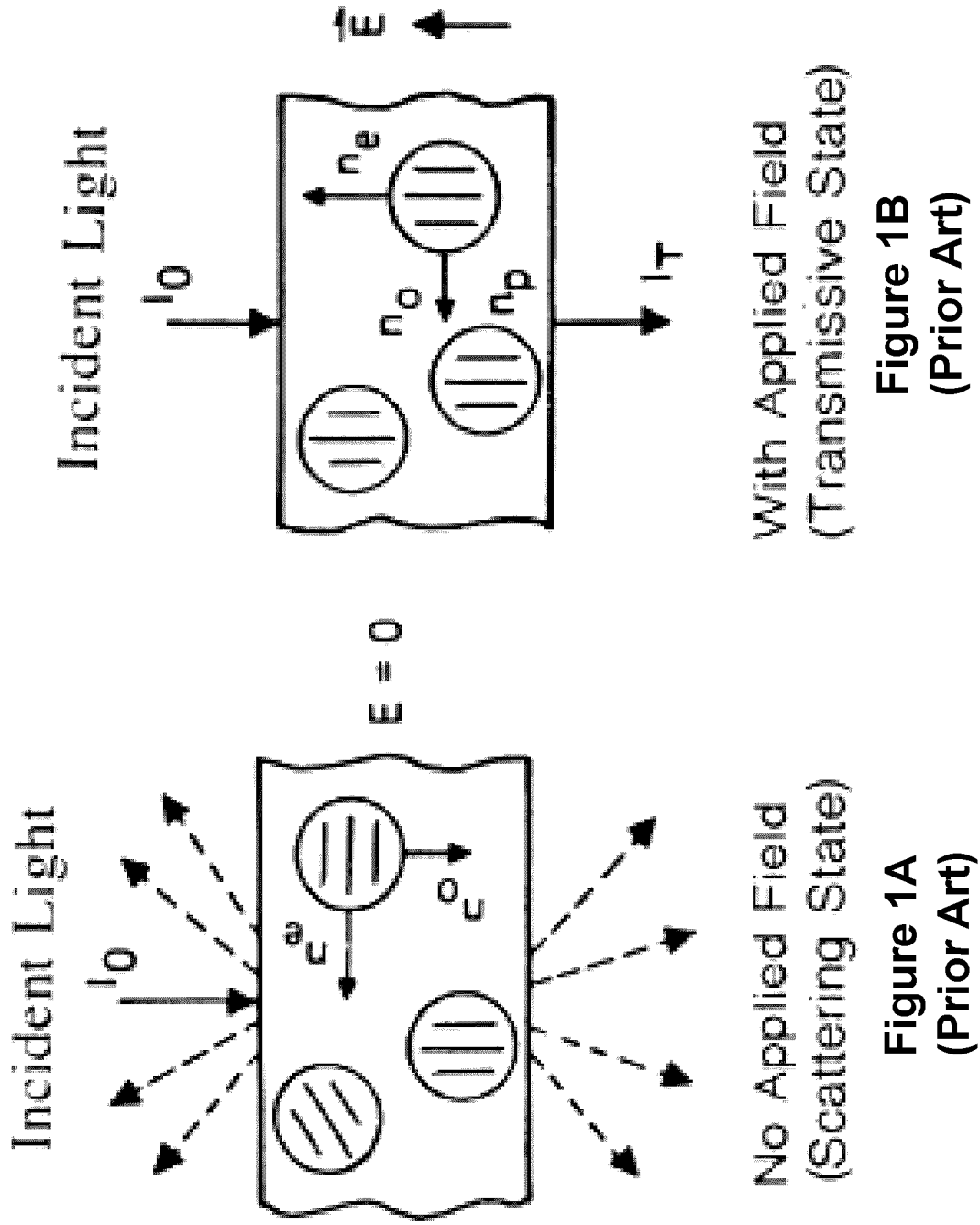
FIGS. 1A and 1B are schematic diagrams illustrating a prior art material respectively scattering and transmitting light.
Figure 2:
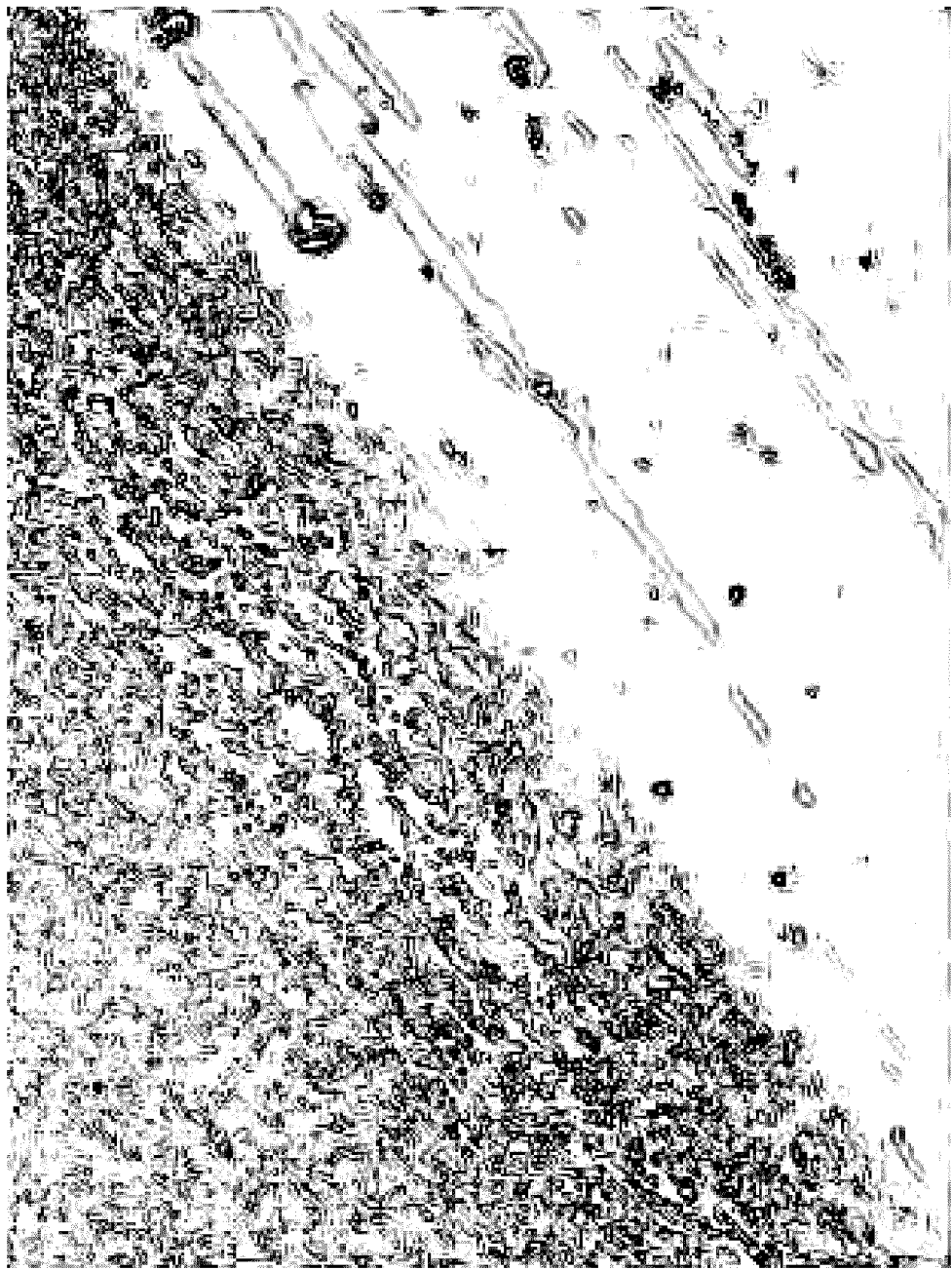
FIG. 2 is an illustration of a prior art polymer concentration gradient in a liquid crystal.
Figure 3:
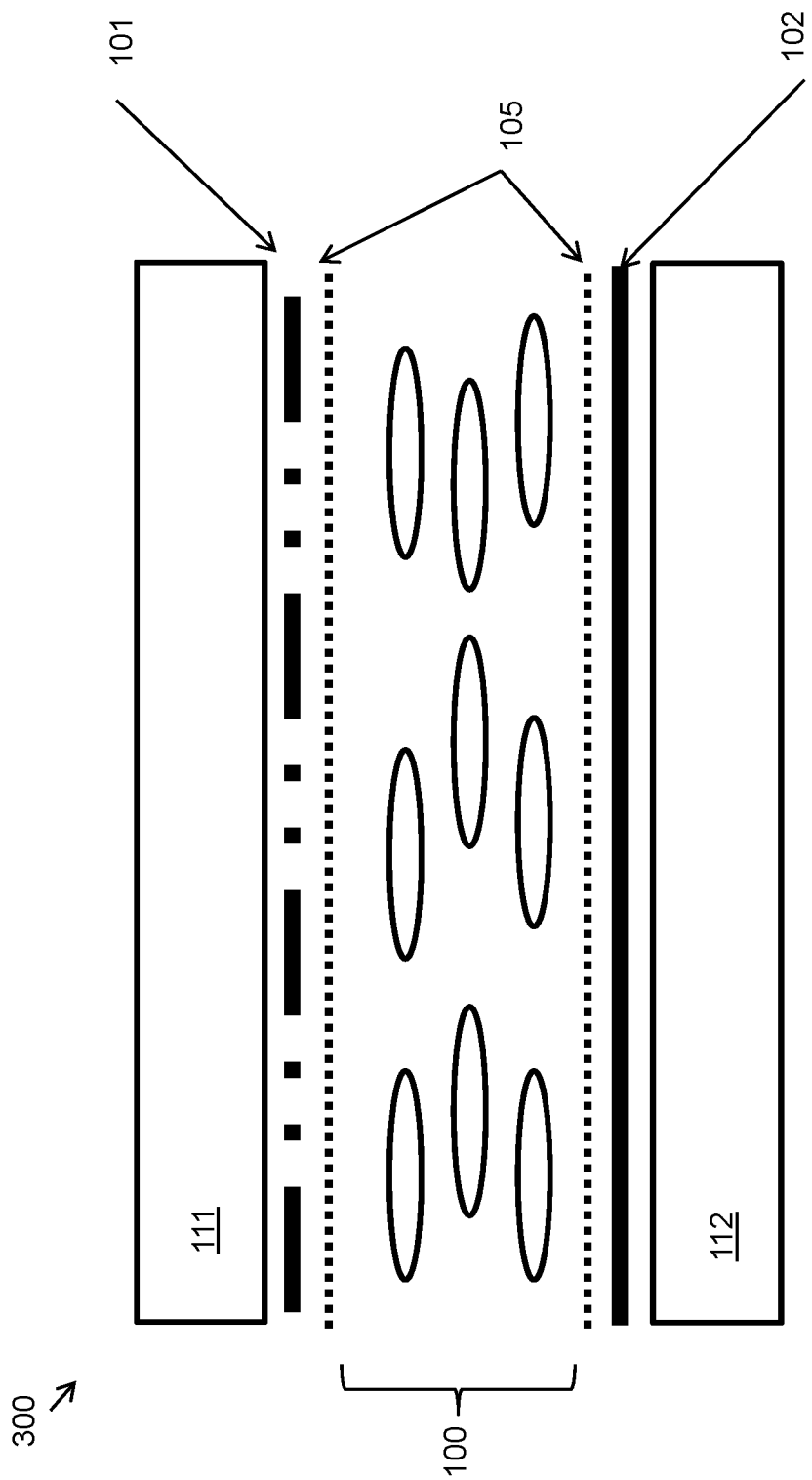
FIG. 3 is a schematic diagram illustrating a layered geometry of a liquid crystal cell in accordance with an implementation of a first embodiment of the proposed solution.

FIG. 3 illustrates an implementation 300 in which a nematic LC layer 100 substantially free of polymer is preferably sandwiched between a pair of LC orientation layers 105 (e.g. organic polymer or inorganic layers) which provide electrical isolation and induce a preferential orientation of LC molecular directors in the LC material 100. Alternatively, the transparent electrode layers 101 and/or 102 can be used to align the liquid crystal 100, for example by rubbing the transparent electrode material. An electric field is applied to the LC layer 100 via a uniform transparent electrode 102 (e.g. Indium Tin Oxide (ITO)) and a non-uniform transparent electrode 101 (e.g. ITO) sandwiching the LC layer 100 outside the LC orientation layers 105. An optional index matching layer (not shown) can be employed in combination with the transparent electrodes. Optionally, the non-uniform transparent electrode 101 may be patterned (holes, lines, etc.) and controlled by one electric potential. Alternatively, multiple independent electrode patterns may be used and controlled by more than one voltage.

While the polymer network of a PSLC or the droplet character of liquid crystals in PDLCs guarantee a rapid return to a ground state when the electric field is reduced, in accordance with another implementation of the proposed solution dual frequency nematic liquid crystals (100) are employed to provide such a response (De Gennes P. G. and Prost J., "The Physics of Liquid Crystals", Oxford University Press, 1995, 2nd Edition). Dual frequency nematic LC materials (100) can be forced to relax by changing the frequency of the electric field. In accordance with a third implementation, dual frequency cholesteric liquid crystals (100) are employed which, in addition, would provide control of energy flux by providing back reflection/scattering of light.

Figure 4:
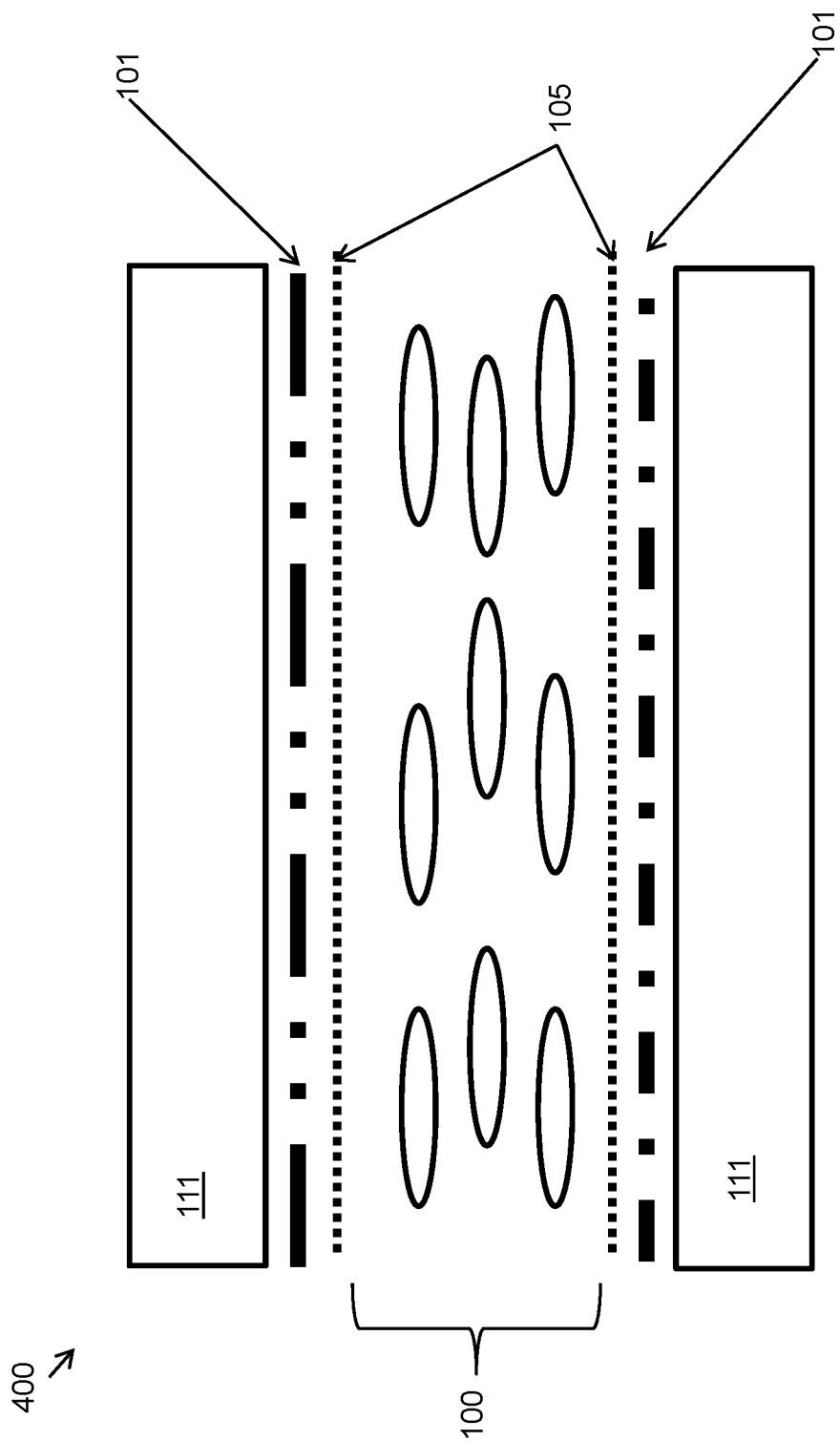
FIG. 4 is a schematic diagram illustrating a layered geometry of a liquid crystal cell in accordance with another implementation of the first embodiment of the proposed solution.
Figure 23:
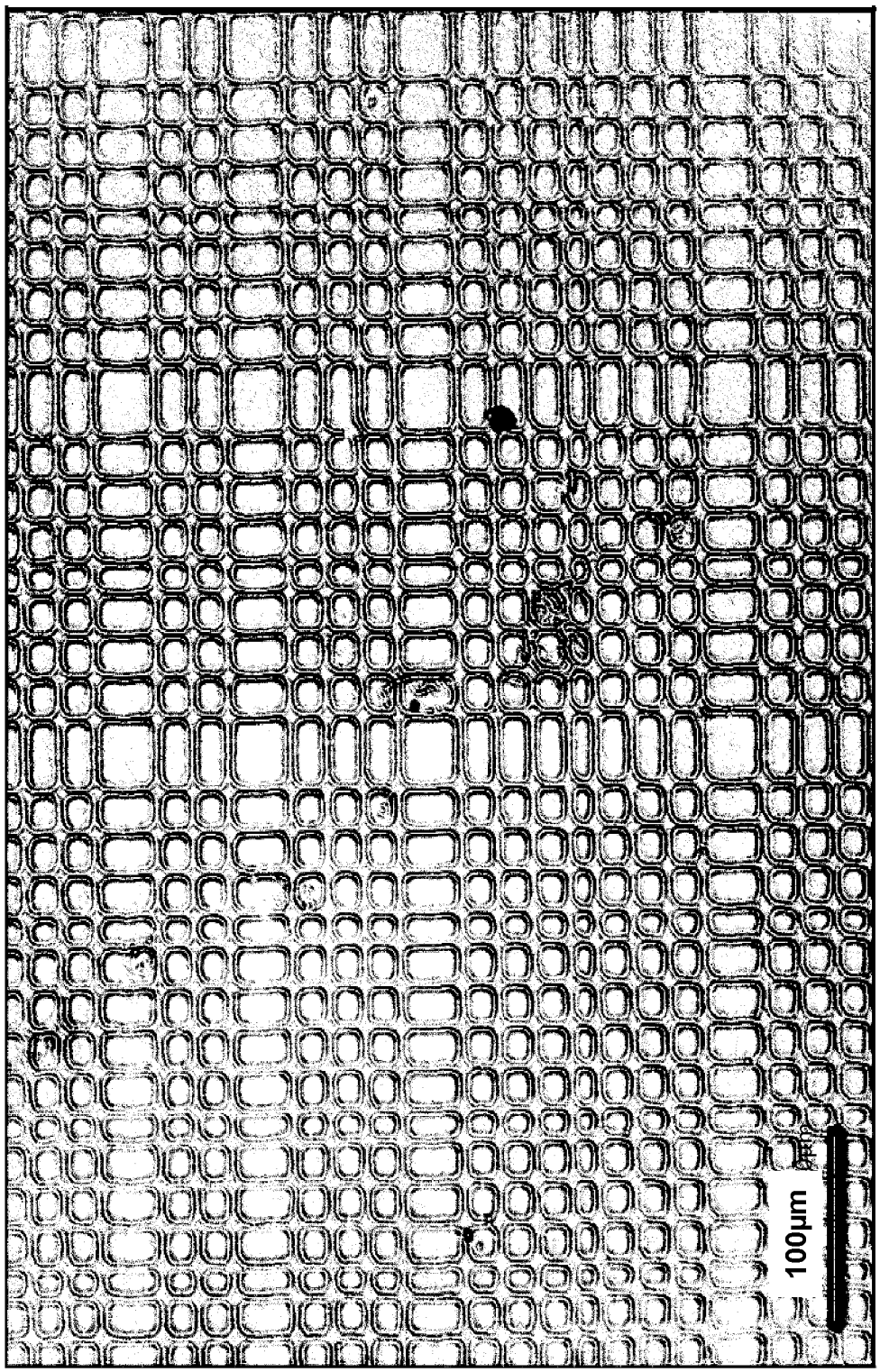
FIG. 23 is an illustration of an example of a non-uniform electrode pattern in accordance with the proposed solution.

However, the above proposed solutions suffer from polarization dependence. When using simple nematic liquid crystal compositions in the absence of polarizers what is needed to obtain a polarization independent operation is the generation of three dimensional (3D) orientation defects (of liquid crystal molecules) in the LC layer 100. The generation of 3D orientation defects can be achieved in different ways:

In accordance with a fourth implementation, planar uni-directional orientation layers 105 are employed to define strong alignment boundary conditions in the ground state, together with non-uniform transparent electrodes 101 (as described hereinabove) on each side of the LC layer 100 sandwiched therebetween. This can be achieved by the use of two non-uniform electrodes 101 as described above (with one or more control voltages) on each side of the LC layer 100, preferably, spatially shifted and cross-oriented in a layered geometry 400 schematically illustrated in the FIG. 4. A particular example of an electrode structure includes chaotically distributed holes on the surfaces of both transparent electrodes 101. Another example is the use of linear strip electrodes on each substrate 101 (the geometrical pattern of strip electrodes can vary as desired), however if the orientation of the stripes of one electrode 101 on one substrate 111 is, say along X axis, then the orientation of the stripes of the other electrode 101 on the opposed substrate 111 is along the Y axis (Z axis being perpendicular to the cell substrates). Another example is illustrated in FIG. 23 which is a micro photograph of an example of spatially non-uniform ITO electrode.

Figure 5:
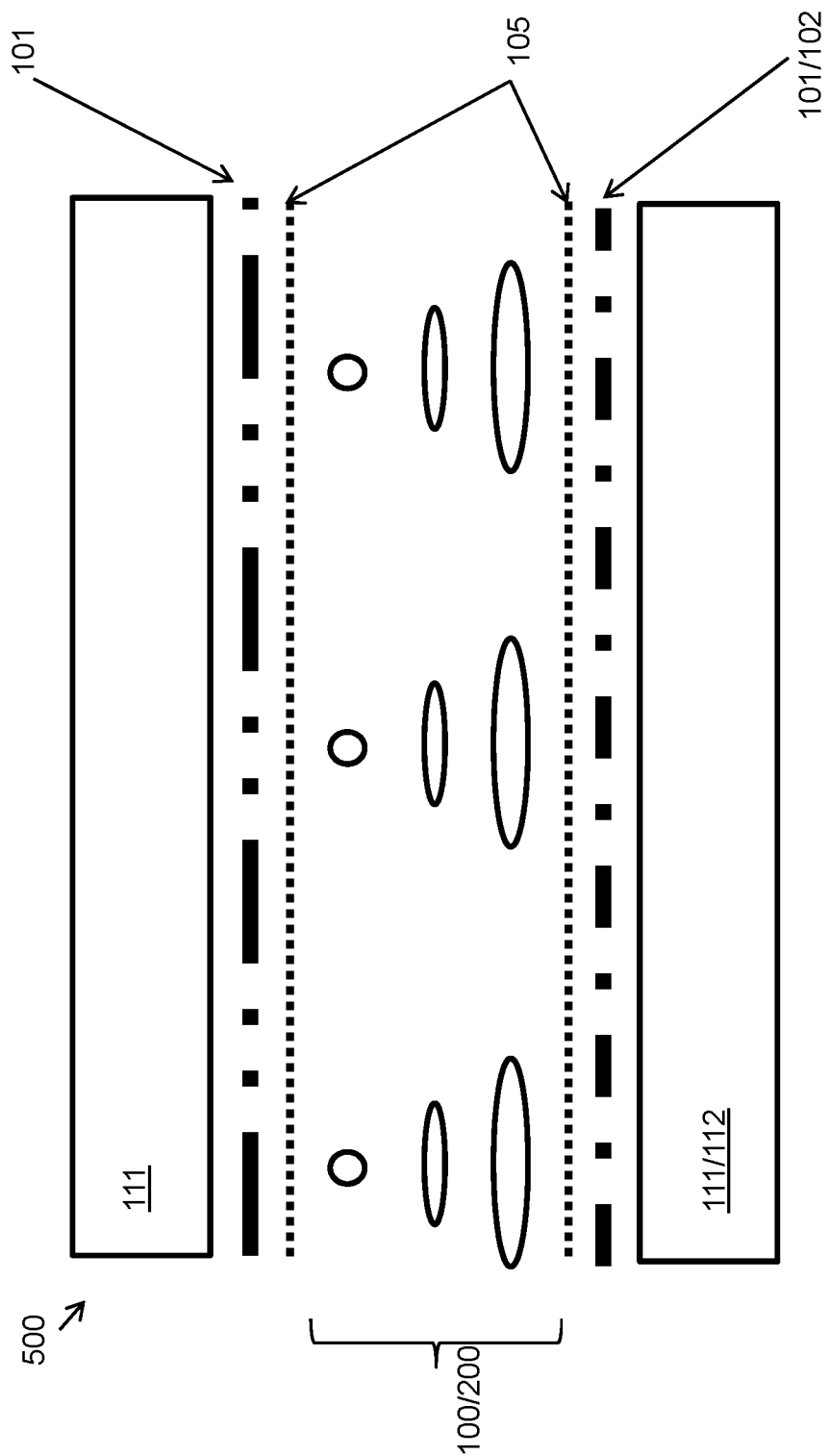
FIG. 5 is a schematic diagram illustrating a layered geometry of a liquid crystal cell in accordance with a further implementation of the first embodiment of the proposed solution.

In accordance with a fifth implementation, polarization independence can be achieved by using two alignment layers 105 oriented in perpendicular directions, generating a twisted alignment of the nematic liquid crystal material 100 in the ground state, for example as shown in the layered geometry 500 illustrated in FIG. 5. Both electrode layers can be non-uniform 101 or a combination of uniform electrode layer 102 and non-uniform electrode layer 101 can be used.

In accordance with a sixth implementation of the proposed solution, a similar effect of reducing polarization dependence of light scattering can be obtained by employing cholesteric liquid crystal (single or dual frequency) materials (200) of given helicity. In this implementation, electrically induced orientation defects can be made such that one of the circularly polarized components of the incident light is back reflected and/or scattered by the first layers of the LC material (200) (with the given circularity), while the "non-affected" circular polarization of light is gradually depolarized during its propagation in the initial layers of the LC material (200) and then is gradually reflected from the remaining layers of the material (still with the same circularity).

In manufacturing layered geometries in accordance with the above embodiment, the first (top) support substrate 111 is covered by a non-uniform, e.g. "hole-patterned", transparent conductive electrode 101 (which can also be patterned and controlled by multiple voltages and different frequencies and phases), such as ITO. The non-uniform hole patterning can be manufactured, for example, by local laser exposition (deposition/ablation/etching) or by chemical etching. Typical hole sizes can be, for example, in the order of 5 to 30 micrometers and the distances between holes can be between, for example, 3 to 15 micrometers. The holes can be distributed on the substrate 111 surface as periodic, quasi periodic, chirped or preferably as chaotic 2D arrays, such that the electric potential applied to conductive layer 101 propagates over the connected surface. This substrate 101 is preferably also covered by a unidirectionally rubbed layer of polyimide 105. The second bottom substrate 112 is covered by a uniform transparent and conductive layer 102, for example including an ITO electrode 102 preferably (but not necessisarily) coated with a rubbed polyimide layer 105. The thickness of the LC cell can be between 5 to 20 micrometers. Preferably, the LC cell is filled with dual-frequency cholesteric liquid crystal 200 for example having a reflection resonance in the visible spectrum.

In the operation of the dual frequency cholesteric liquid crystal implementation, a spectrally resonant reflection of light of given circularity is provided in the absence of electrical excitation as the liquid crystal molecules 200 align uniformly due to the presence of the alignment layers 105. This ground state can, in principle, be different depending if the LC cell 300/400/500 was relaxed after excitation for example at 1 kHz (positive liquid crystal dielectric anisotropy) or after excitation for example at 100 kHz (negative liquid crystal dielectric anisotropy). The defect structure in the excited state will be different for the case of excitation with 1 kHz frequency that is destroying the helix by "attracting" molecular axes to the electric field, compared to excitation at 100 kHz that is "repulsing" the liquid crystal molecules away from the electric field.

Figure 6A:
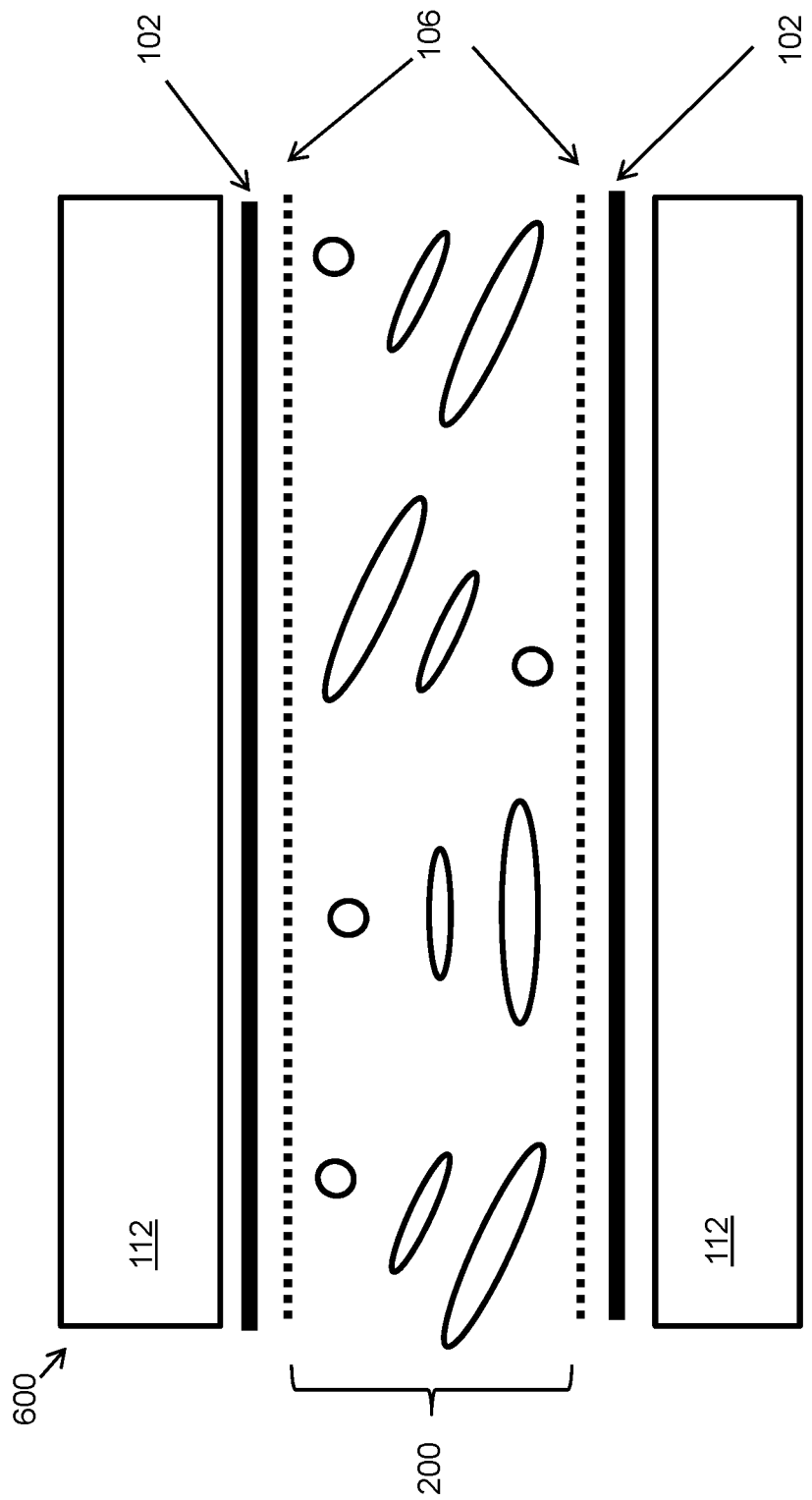
FIG. 6A is a schematic diagram illustrating a layered geometry of a liquid crystal cell in accordance with another embodiment of the proposed solution.

However, from a manufacturing point of view, it would be desirable to make liquid crystal cell-sandwiches 600 without alignment layers (105) (alignment layers which are usually obtained by rubbing, oblique deposition in vacuum or photo exposition). In addition, the removal of the alignment step and, for example by using low anchoring energy materials 106 or simply omitting the rubbing step can help induce orientation defects in the ground state, between the excitation states, when there is no electrical excitation in the un-powered state as illustrated in FIG. 6A. However, such defects are difficult to reproduce on a manufacturing scale and, once obtained are not stable against mechanical deformations or temperature variations.

In accordance with another embodiment of the proposed solution, liquid crystal sandwiches as previously described are employed however without inducing a preferential alignment direction. In order to address the above mentioned problems of control and instability, the use (during operation) of a sequence of electrical pulses or a train of pulses is proposed to maintain the LC cell state in the desired "defect" configuration, which can be clusterized and thus non-uniform or uniform such as in a reflecting helix configuration.

Figure 6B:
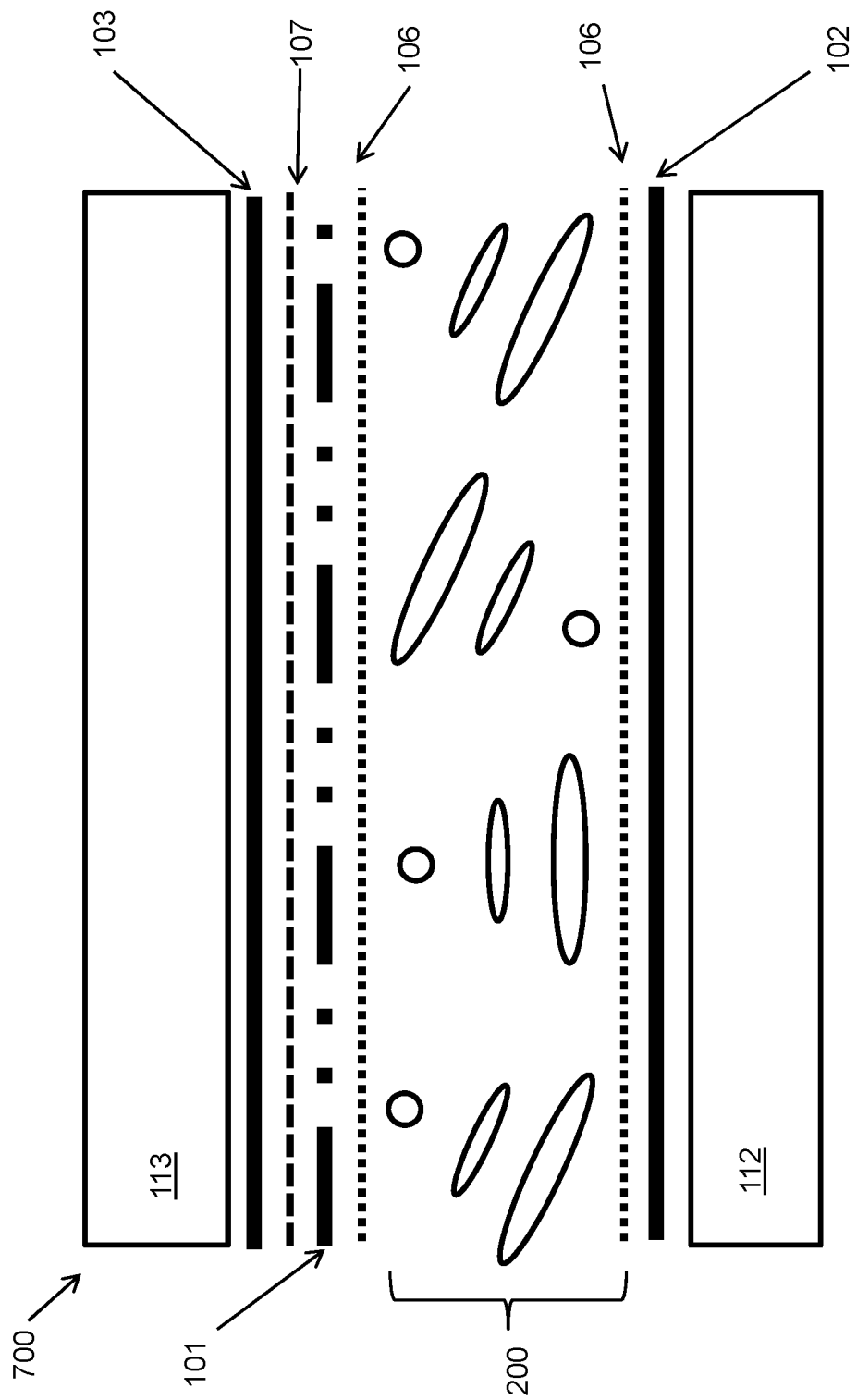
FIG. 6B is another schematic diagram illustrating a layered geometry of a liquid crystal cell in accordance with another implementation of the second embodiment of the proposed solution.

In accordance with another implementation of the previous embodiment, liquid crystal sandwiches (300/400/500) as previously described are used without inducing a preferential alignment direction, however to address the above mentioned problems of control and instability, an additional layer 103 of transparent conductive electrode (optionally with an index matching layer) is employed as shown in the layered geometry 700 illustrated in FIG. 6B. The role of the electrically isolating layer 107 may be important since, in this implementation, different zones of the non-uniform ITO are needed to have the same or similar electrical potential, while at the same time a significantly different potential is needed uniformly to cover the holes of the non-uniform electrode 101. The different portions (lines, etc.) of the non-uniform electrode 101 may be controlled by using different voltages, phases and frequencies.

Figure 6C:
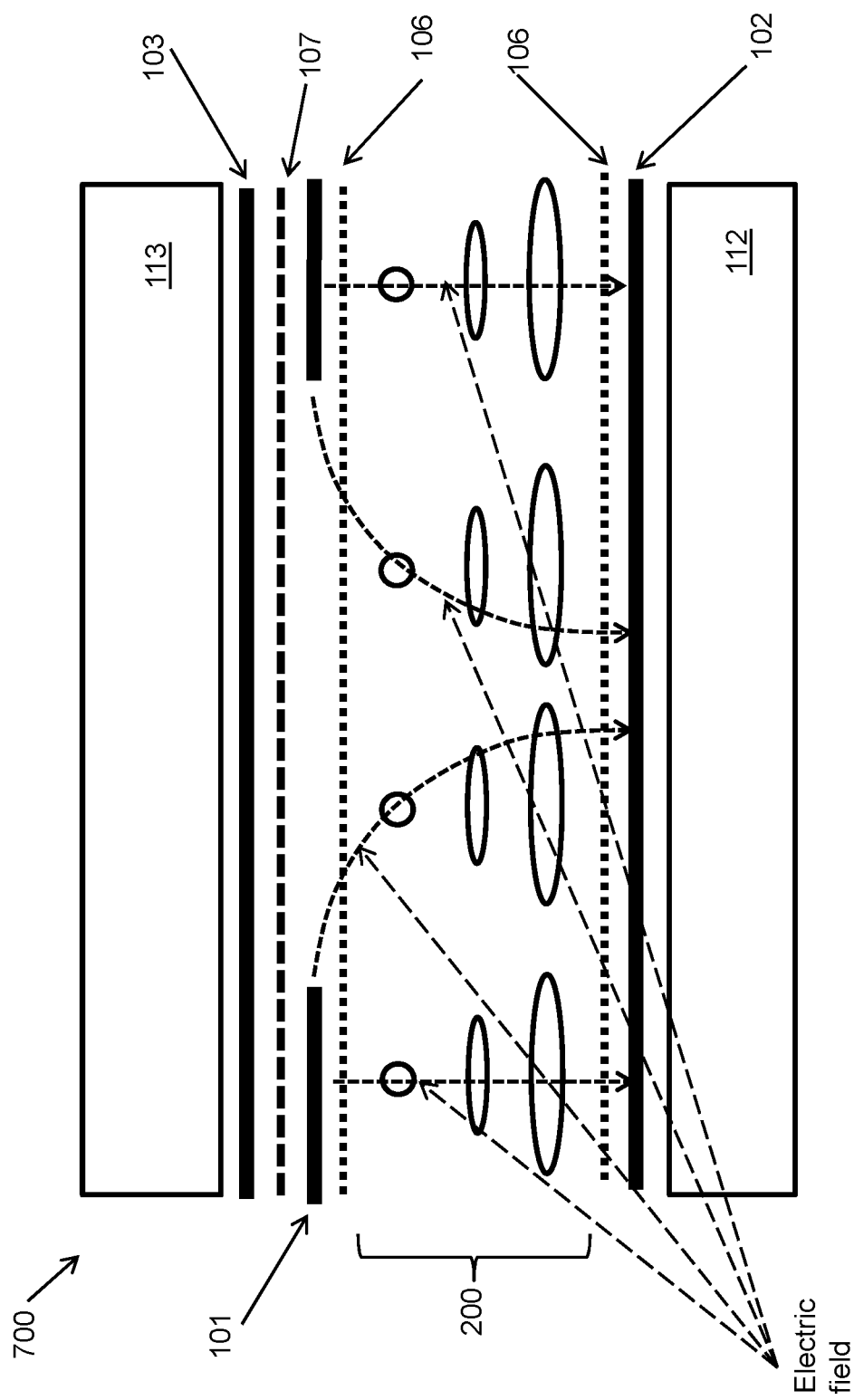
FIG. 6C is a further schematic diagram illustrating a micro scale layered geometry of a liquid crystal cell in accordance with a further implementation of the second embodiment of the proposed solution.

The use of two uniform electrodes 102 (in "traditional" devices) provides an electric field which is perpendicular to the substrates to unwind a uniform helix of CLC, which requires a relatively high threshold voltage to start the process. Employing the proposed non-uniform electrode 101 (/103) approach provides low voltage level operation to unwind the uniform Cholesteric Liquid Crystal (CLC) helix (in fact, it would even start without threshold). This is demonstrated schematically in FIG. 6C for one "hole" (or one "pair") of ITO by the perpendicular (on both peripheries) and tilted (internal sides of holes) electric fields. The presence of ITO non-uniformities correspondingly creates non-uniformities in the electrical field.

Figure 7:
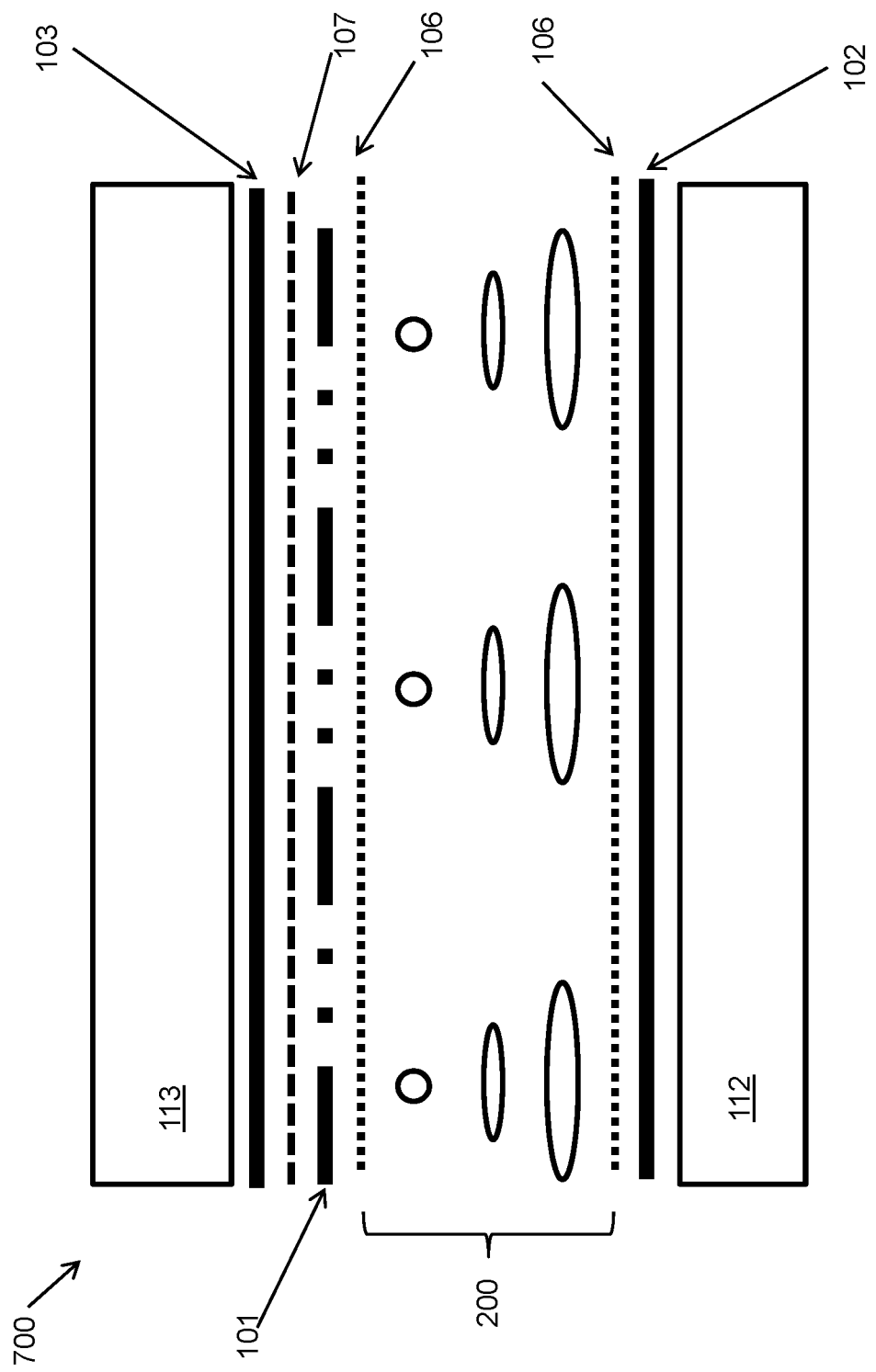
FIG. 7 is a further schematic diagram illustrating a large scale layered geometry of a liquid crystal cell in accordance with the implementation of the second embodiment of the proposed solution illustrated in FIG. 6C.

In accordance with the above embodiment, the "natural" alignment of the liquid crystal material can contain molecular alignment defects which will scatter light, including scattering in the back direction, providing energy flux control. The application of a voltage between the uniform electrodes 103 & 102 can stabilize the helical structure if the frequency of the electrical signal is, for example, 100 kHz as illustrated in FIG. 7. In this case, the cell 700 selectively reflects 50% light of given wavelength and circular polarization. There are many techniques, including the use of a second cell (700) with the liquid crystal material 200 of opposed chirality (other handedness), to achieve additional reflection up to 100%. In the case in which the frequency of an applied electrical voltage is switched for example to 1 kHz, then the electric field destroys the helical structure of the liquid crystal 200 and orients molecules in the perpendicular direction to the substrates 112/113. In this state (FIG. 8D) the cell becomes substantially transparent for all wavelengths, polarizations and propagation directions (without haze).

The proposed device 700 has much more operational variability since a voltage can further be applied between the electrodes 101 & 102, which creates different types of defects due to the non-uniformity of the electrode 101 depending upon the frequency of the electrical field applied. The defects can be formed by the attraction of molecular axes if the frequency is for example 1 kHz and by the repulsion of molecular axes if the frequency is for example 100 kHz. It has been discovered that the ground state orientation when the field is removed will have different defects depending on the original state, excited by 1 kHz or 100 kHz. This step of application of voltage between electrodes 101 and 102 may be used as an intermediate step when passing from reflective to transmissive states to reduce the voltage required to unwind the helix. In this case, this step may be followed by the application of a low frequency voltage between two uniform electrodes 102 & 103.

With reference to FIGS. 8A, 8B, 8C and 8D the above described modes of operation are characterized by:

FIG. 8A illustrates the state corresponding to the application of electrical potential difference U applied at a high frequency, eg. 100 kHz, between electrodes 103 & 102, with the electrode 101 being left (electrically) floating, potential difference which stabilizes a uniform helical structure of LC 200 reflecting 50% of natural light with a resonant wavelength. FIG. 8B illustrates the state corresponding to the potential difference U applied at a low frequency, e.g. 1 kHz, between electrodes 101 & 102, with electrode 103 being left (electrically) floating which destroys the helical structure and creates orientation defects or positive micro lenses assuming that the optical anisotropy Δn of the LC 200 is positive (divergent micro lenses can be obtained if the optical anisotropy of the LC 200 is negative). FIG. 8C illustrates the state corresponding to the potential U applied at a high frequency between the electrodes 101 & 102, with electrode 103 being left (electrically) floating which creates chaotically oriented helical clusters and thus scatters light. FIG. 8D illustrates the state corresponding to the potential difference U applied at a low frequency between the uniform electrodes 102 & 103 with the non-uniform electrode 101 left (electrically) floating which creates uniform molecular orientation (homeotropic) that is substantially optically transparent. Intermediate defect states, which can be obtained when relaxing from excitation states, are also possible and very useful (not shown). To enable all the above mentioned independent control states, the electrical isolation layer 107 between the electrodes 101 & 103 must be efficient enough, which can be controlled by the choice of its thickness d and dielectric constant E, to eliminate capacitive coupling between the two electrode layers 101 & 103. Otherwise, the presence of the uniform electrode 103 may uniformize the electrical potential be applied to the electrode layer 101 inhibiting the creation of defects. (It will be understood that additional optional index matching layeres are not shown.)

The same structure 700 may be filled by a standard liquid crystal, including, for example, homeotropically aligned (in the ground or unpowered state) nematic liquid crystals 100. In this case, the non-uniform electrode layer 101 (with or without the help of the opposed uniform electrode 102) may be used to create various non-uniform molecular configurations, e.g., to focus, broaded or steer light. In "traditional" devices, to go back to the original transmission (e.g., without steering) the field is removed and the natural relaxation brings the system back to the homeotropic state. This may be long, for example for near infra red steering (scanning) applications. However, in the proposed device the presence of two uniform electrodes 102/103 can help to quickly bring the liquid crystal molecules 100/200 back to their background homeotropic alignment. Then the system will remain in this state ready to steer again. Other unpowered (ground state) orientations also may be considered here.

In addition to spectral control over reflection, it is possible to provide spectral control over absorption. The cholesteric LC 200 (normal or preferentially dual frequency) is doped by dichroic dopants (dyes: e.g., blue anthraquinone, azobenzene, carbon nanotubes, etc.) which are aligned with the local director of the LC 200. In this case, their total absorption (averaged along the depth of the LC cell) will be different compared to the case when the helix is unwound and the LC is homeotropically aligned (which will thus realign also the dichroic dopants). The resonant wavelength of reflection of the helix $\lambda_{RR}$ may be chosen to be the same as the resonant absorption wavelength $\lambda_{RA}$ of the dichroic dopant. In this case, the switch will enable the overall transmission control at $\lambda_0 = \lambda_{RR} = \lambda_{RA}$. In contrast, if $\lambda_{RR} \neq \lambda_{RA}$, then the switch (between helical and homeotropic states) will enable the simultaneous control of the resonant reflection and absorption of the guest-host material system. More sophisticated control depending on whether the dischroism of the dopant is positive or negative can be obtained. In one interesting case, the $\lambda_{RA}$ may be in the infra-red spectral region to control the energy flow through a window containing the device(s) described herein.

Figure 9B:
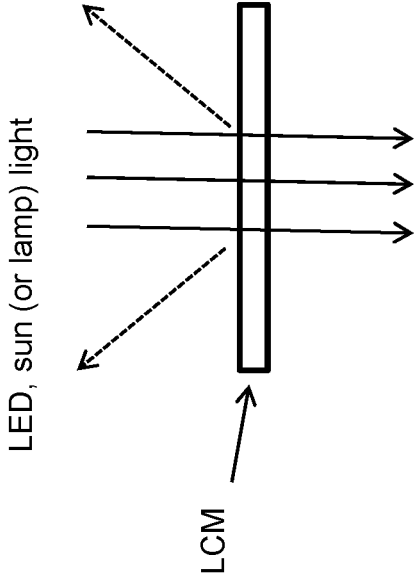
FIG. 9B is a schematic diagram illustrating a color control device in accordance with the proposed solution.

The ability to modulate a color of light transmitted can thus be enhanced by using a dichroic dopant, such as dyes or carbon nanotubes that align with the liquid crystal 200 (100) to provide high absorption in a specific spectral range. While the resonant reflection spectra of the cholesteric helix, namely the host, may be in the same or in another, e.g. visible, spectra. In the planar state of cholesteric cells, the reflection and absorption are predetermined. Once a low frequency voltage is applied to such cells (700), they are transformed into homeotropic state, and the resonant reflection disappears, and the absorption also changes. This arrangement can be used to change the color temperature of an LED light source, for example. (An example implementation is presented in FIG. 9B in which an LED can be used in a flash device for a variable visible or near infrared illuminator.) In this case, both the $\lambda_{RA}$ and $\lambda_{RR}$ may be in the visible spectral band (still different, $\lambda_{RA} \neq \lambda_{RR}$) and the switch will allow better control over the spectra of the transmitted light. For example, if the helical state reflects in the red band and the dye has a positive dichroic absorption in the green band, then the helical state would correspond to the reflection of the red and higher absorption of the green, and thus, for white incident light, the transmitted light will be mainly blue. The switch to the homeotropic state will eliminate the red reflection and also will reduce the green absorption and the transmitted light will look more as white. It will also be appreciated that multiple cholesteric cells 700 with different resonant wavelengths (pitch of helix) can be combined with different absorption wavelengths (dichroic dyes).

This provides a very rich set of possible orientational configurations:
- defect texture in the ground state at no voltage following relaxation from 1 kHz excitation state,
- defect texture supported by a train of pulses at low frequency,
- defect texture in the ground state at no voltage following relaxation from 100 kHz excitation state,
- defect texture in excited state at 1 kHz with electrical potential difference applied between electrodes 102 and 101,
- defect texture in excited state at 100 kHz with electrical potential difference applied between electrodes 102 and 101,
- uniform helicoidal texture with resonant reflection in excited state at 100 kHz with electrical potential difference applied between electrodes 102 and 103,
- uniform helical texture that is unpowered thanks to the surface alignment (105),
- uniform homeotropic texture (substantially transparent) in excited state at 1 kHz with electrical potential difference applied between electrodes 102 and 103, as well as
- other stable, quasi-stable or bistable defect structures by applying specific transitory electrical excitation signals (sequences of different voltages and frequencies) between different electrode pairs.

Figure 9A:
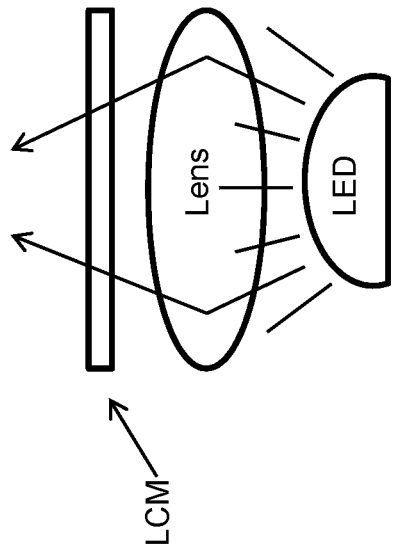
FIG. 9A is a schematic diagram illustrating an optical shutter in accordance with the proposed solution.
Figure 11:
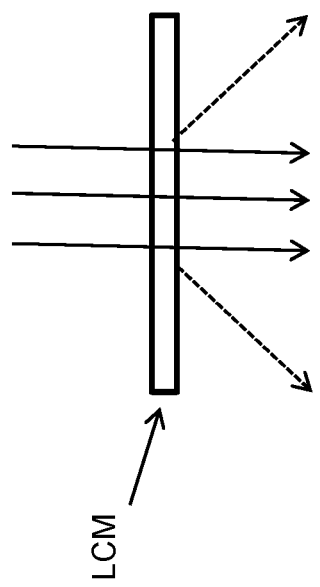
FIG. 11 is a schematic diagram illustrating a controllable reflector plate in accordance with the proposed solution.
Figure 10:
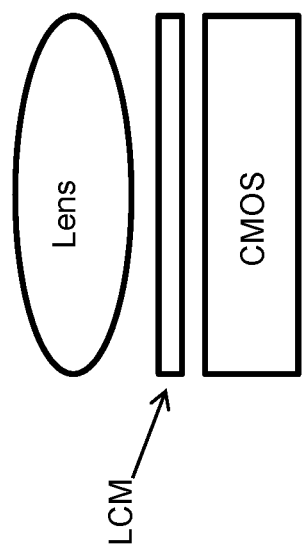
FIG. 10 is a schematic diagram illustrating a privacy window/diffuser in accordance with the proposed solution.

The proposed Liquid Crystal Modulator (LCM) devices can be used as:
- light shutters or variable diaphragms, for example for optical imaging (FIG. 9A);
- mobile variable illumination (divergence, color, etc.) in the visible spectrum (for example for imaging) or in the near infrared spectrum, for example for eye scanning, etc. (FIG. 9B),
- for controlling light scattering in forward propagation direction for example to controllably destroy the transmitted image for privacy windows, (FIG. 10);
- for partially controlling the color of transmitted light;
- for diffusing point sources of light for example to soften LED lighting and/or to control its glare (FIG. 10);
- for controlling energy flow by controllable light reflection, for example in "energy smart" buildings (FIG. 11); etc.

Figure 12:
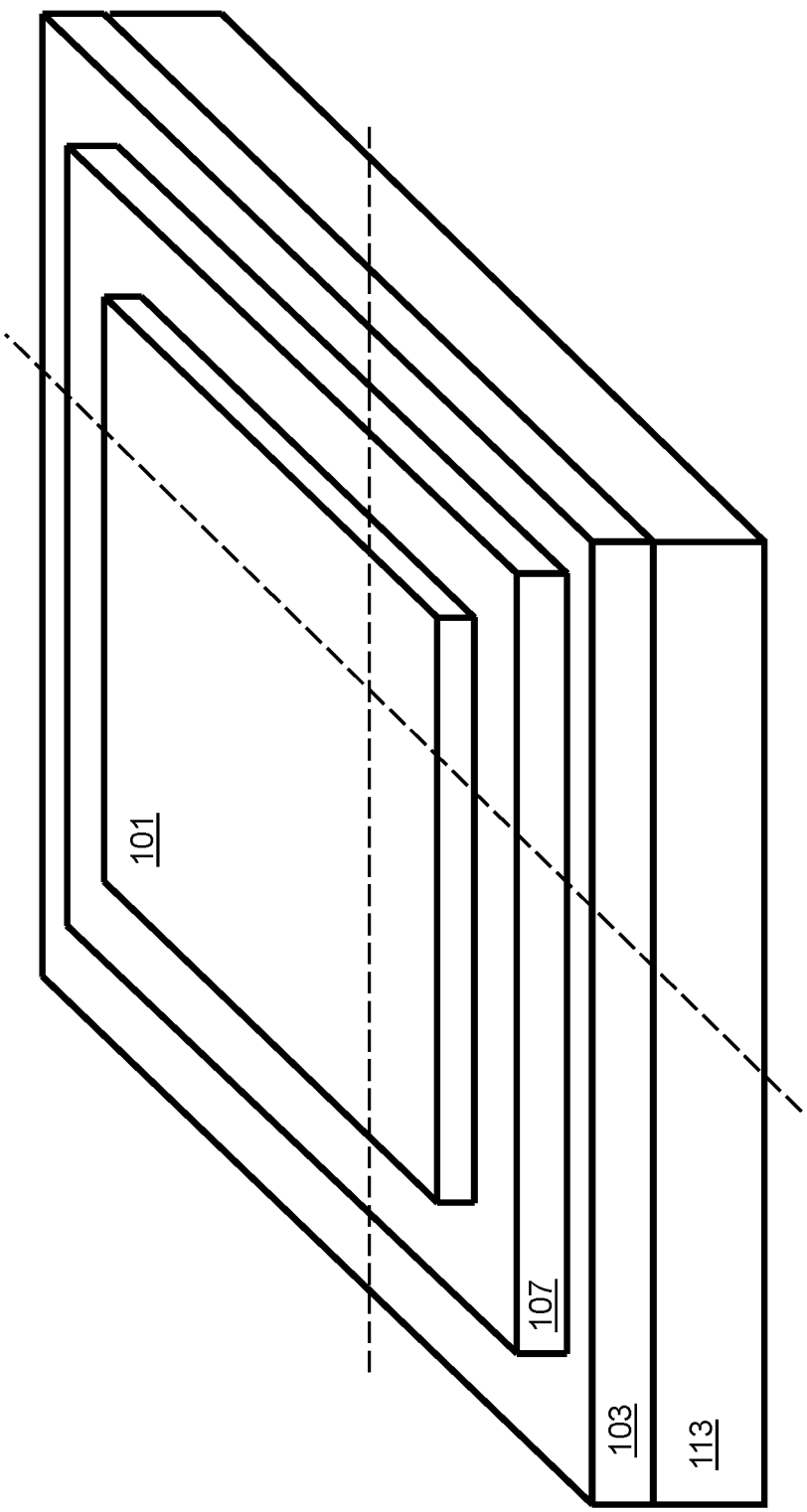
FIG. 12 is a schematic diagram illustrating wafer scale manufacturing employing mask deposition techniques in accordance with the proposed solution.

Manufacturing includes (FIG. 12): the top substrate 113 is first covered by a uniform transparent conductive electrode 103, such as ITO which is then covered with a relatively thick (several micrometers + or −) isolation layer 107 that can be dielectric, metal oxides, etc., and then covered by a "hole-patterned" ITO electrode 101. Without limiting the invention, the hole patterned electrode 101 can be obtained from a uniform electrode, for example by chemical etching (FIG. 23). The typical size of holes or electrode spacing can be in the order of 5 micrometers and the distances between holes could be between 10 to 20 micrometers, the non-uniformities being distributed on the surface as periodic, quasi periodic or preferably chaotic 2D arrays. This layered structure can also be covered by an electrically and orientationally isolating layer for example a layer of polyimide 106, however without rubbing. The second bottom substrate 112 can have an ITO electrode 102 thereon and can be covered by an isolating layer, such as a non-rubbed polyimide 106. The LC cell 700 is filled with a dual frequency cholesteric liquid crystal 200, preferably with a resonance in the visible range. The thickness of the LC cell 700 can be between 5 to 20 micrometers.

The proposed devices can be manufactured by using techniques of large scale processing developed for example by the liquid crystal display industry. Depending upon the target application, the layered structure of the LC cell (700) and the complexity of the electrical driving scheme can be different. For example, thin film transistors can be added if the device is used for imaging applications. At the opposite end of the manufacturing spectrum, the layered structure of the LC cell (700) and the driving scheme can be extremely simple if the device is used as smart window.

The manufacturing approach can also be adapted to enable flexible and customized manufacturing. For example, the arrangement of various layers and the mask deposition can be used as illustrated in the FIG. 12 wherein the dashed lines schematically show possible dicing lines providing custom sizing. In this case, the dicing process can be performed at low temperature (followed by additional sealing by adhesive) or with a laser, etc. and the parts thus separated can provide access to various electrode layers. Alternatively, conductive adhesive or other type of electrode points can be positioned at various positions to enable electrical contact from the side edge or through-hole connections can be used to obtain the required post-fabrication customization of large panels.

Figure 14:
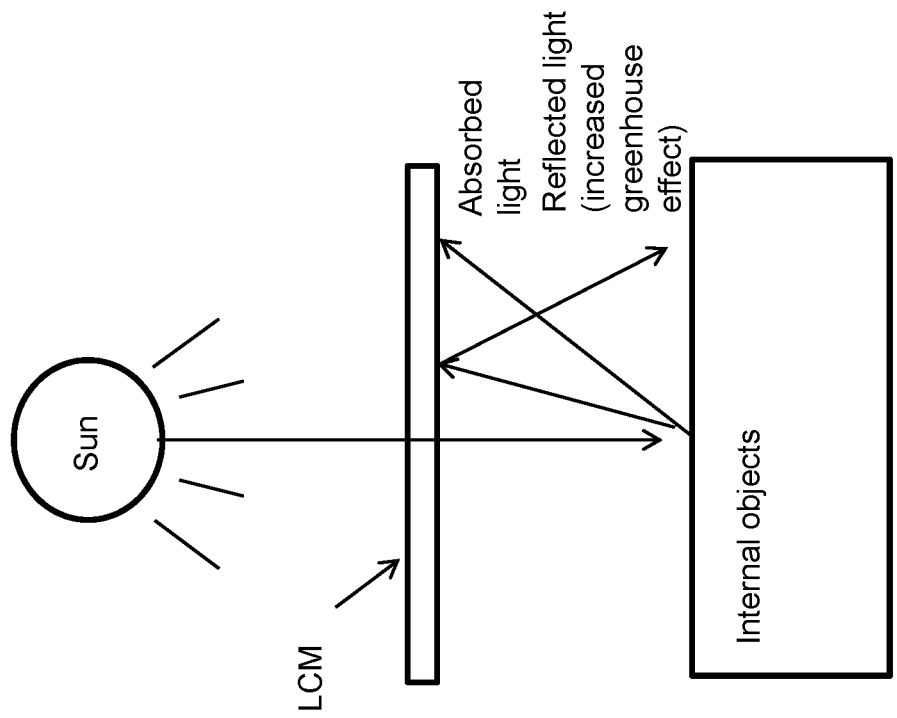
FIG. 14 is a schematic diagram illustrating a liquid crystal modulator device in the form of a greenhouse window pane in a reflecting state in accordance the embodiment of the proposed solution.
Figure 13:
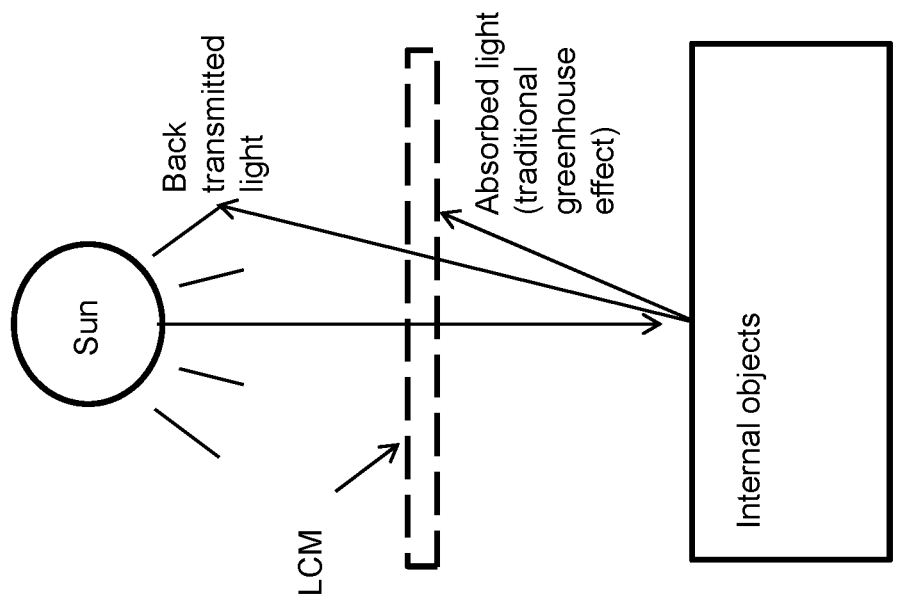
FIG. 13 is a schematic diagram illustrating a liquid crystal modulator device in the form of a greenhouse window pane in a transparent state in accordance an embodiment of the proposed solution.

The proposed Liquid Crystal Modulator (LCM) devices can be used also as window panes providing an artificially "enhanced greenhouse effect". The classical greenhouse effect consists of transmitting one incoming wavelength (typically short) and blocking (absorbing) other predetermined typically longer wavelengths which are emitted by internal objects as outgoing radiation. Incorporating helical LC molecular structures (200) with known spectrally resonant reflection, the proposed multitask windows can be set to be transparent (FIG. 13) for a certain period of time (e.g., during the day) to allow energy flow into the greenhouse; and then switched to their helical resonantly reflecting state to prohibit the energy from going out during the night (FIG. 14) wherein the composition of the LC material layer (or one of layers) is chosen to reflect resonantly the specific wavelength (within a band) emitted by the internal objects (plants). Thus the rate of radiative heat evacuation may be controlled.

Figure 24:
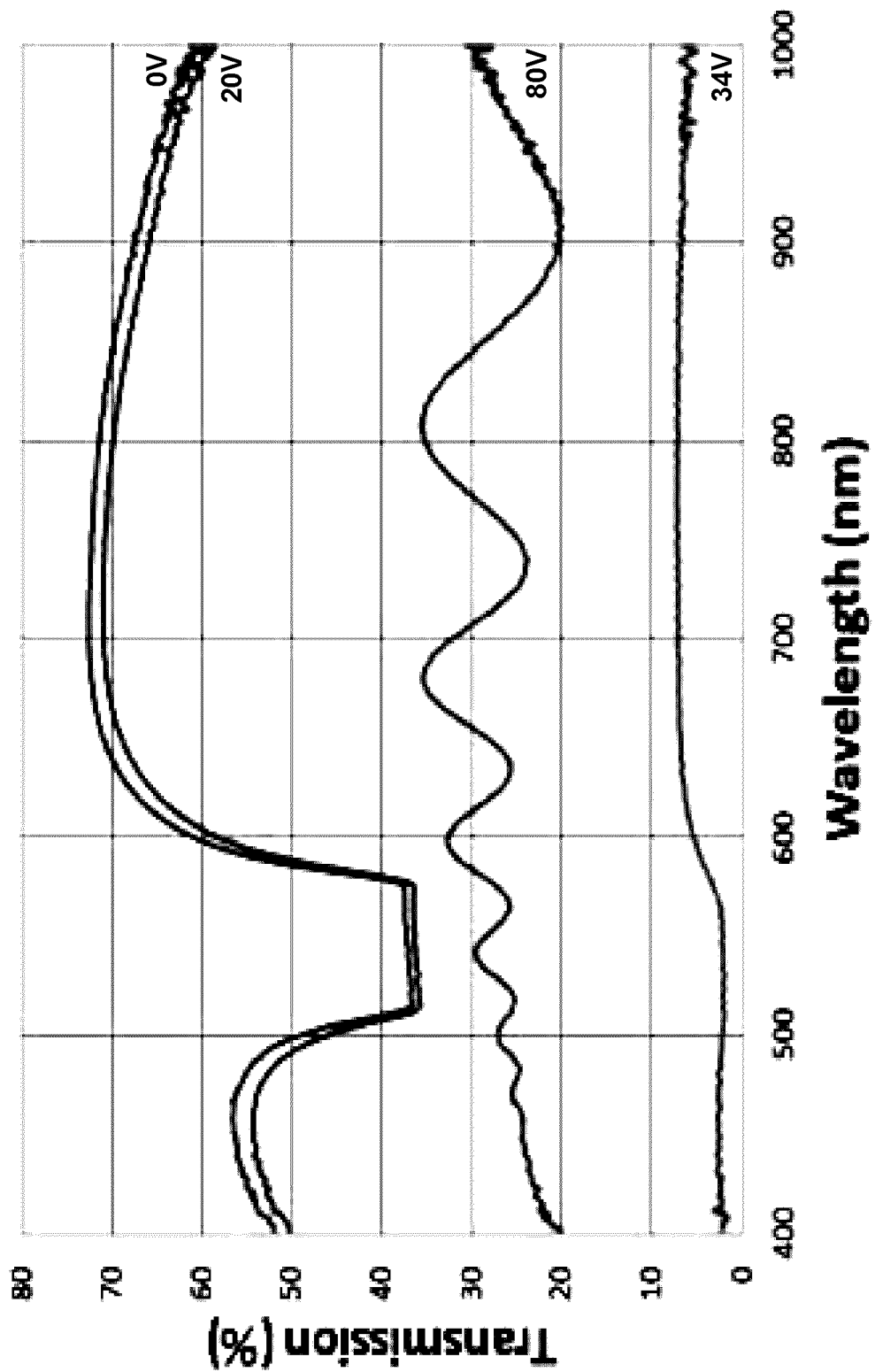
FIG. 24 is a transmission plot illustrating electrical control of transmission spectra in accordance with the proposed solution.

FIG. 24 illustrates an example of electrical control of transmission spectra in a cholesteric liquid crystal cell 300/500/700 having a uniform 102 and a non-uniform 101 ITO layers. The cholesteric resonance is strongest between (in a band) 510 nm and 580 nm which is back reflected for a control field of below 20V. If used for window pane applications this represents a significant reduction in the visible Sun spectrum. The cholesteric helix is destroyed at voltages above 20V. The back scattering is very high for 34V which results in low transmission and the transmission increases when the applied voltage is high—uniformizing alignment. It is noted that the transmission spectra correspond to a single controlled temperature and chiral composition. The above LCM devices employ active control which can be enabled in various ways, including for example a photo voltaic source.

Figures 15, 16:
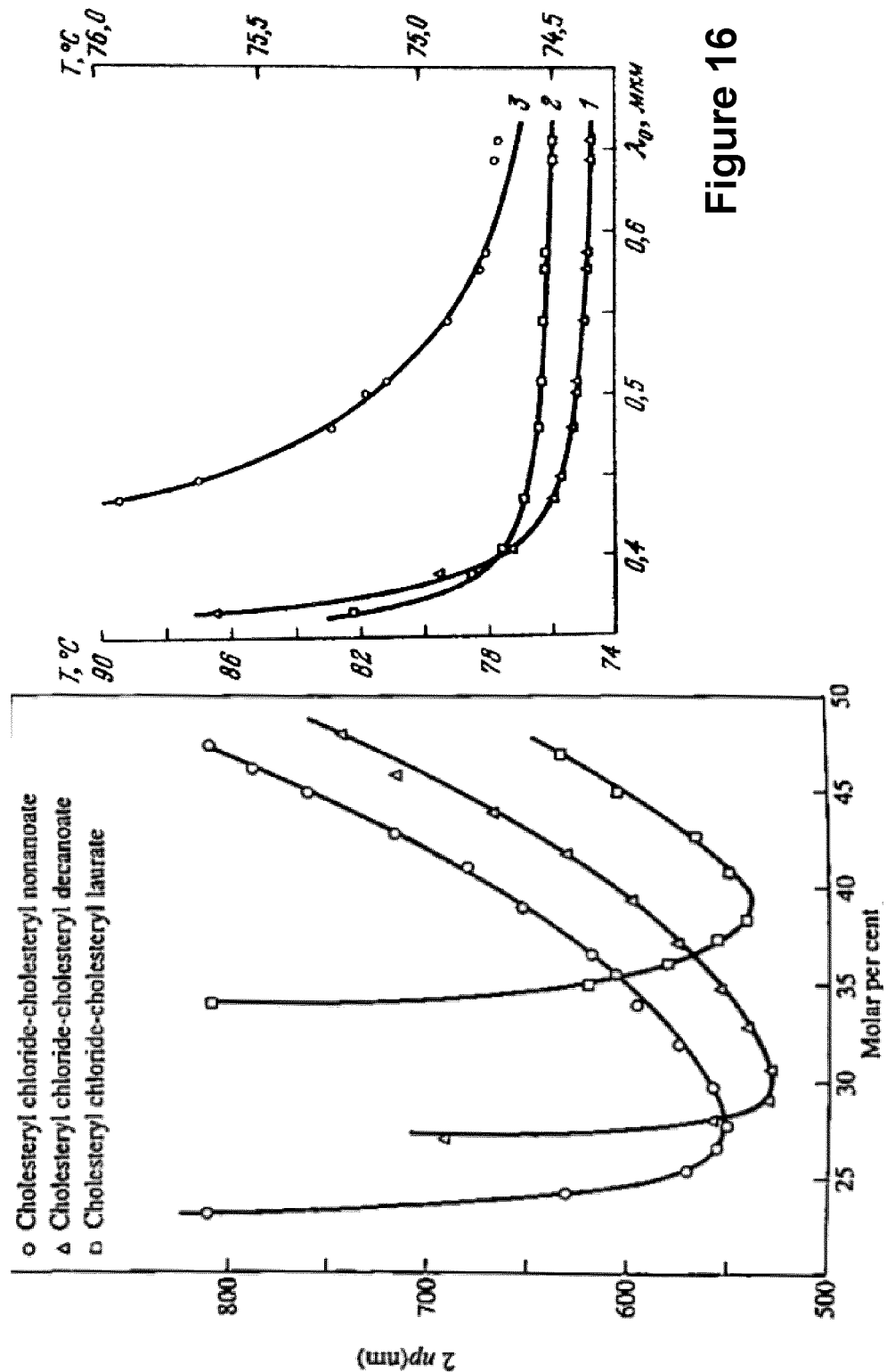
FIG. 15 is a plot of the resonance of binary cholesteric LC mixtures versus composition.
FIG. 16 is a plot illustrating a temperature dependence of the resonant wavelength of reflection.

The resonant character of the LC material 200 can be employed to provide Self-Adjusting LCMs (SA-LCM) which is possible because the resonance wavelength of the LC materials 200 is sensitive to concentrations as illustrated in FIG. 15, (De Gennes P. G. and Prost J., "The Physics of Liquid Crystals", Oxford University Press, 1995, 2nd Edition) and to various natural stimuli, such as the temperature as illustrated in FIG. 16, (V. A. Beliakov, A. S. Sonin, "Optics of Cholesteric Liquid Crystals", Nauka, 1982) for (1) cholesterol perlargonat, (2) cholesterol caprinat and (3) the same as (1) but in a narrow temperature range (see right vertical axes).

Figure 18:
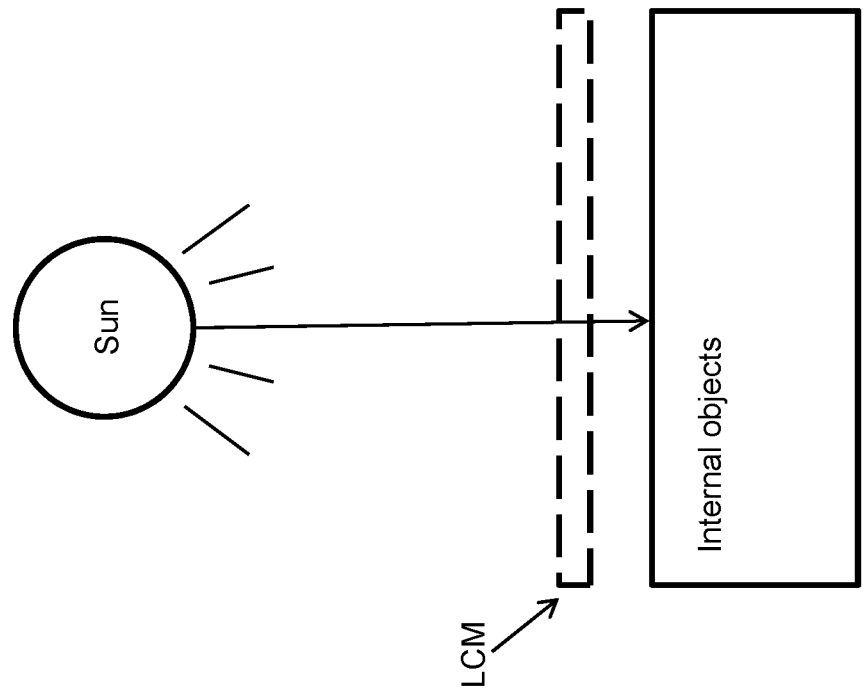
FIG. 18 is a schematic diagram illustrating low temperature resonance at longer wavelengths to reflect infra red radiation in accordance with the proposed solution.
Figure 17:
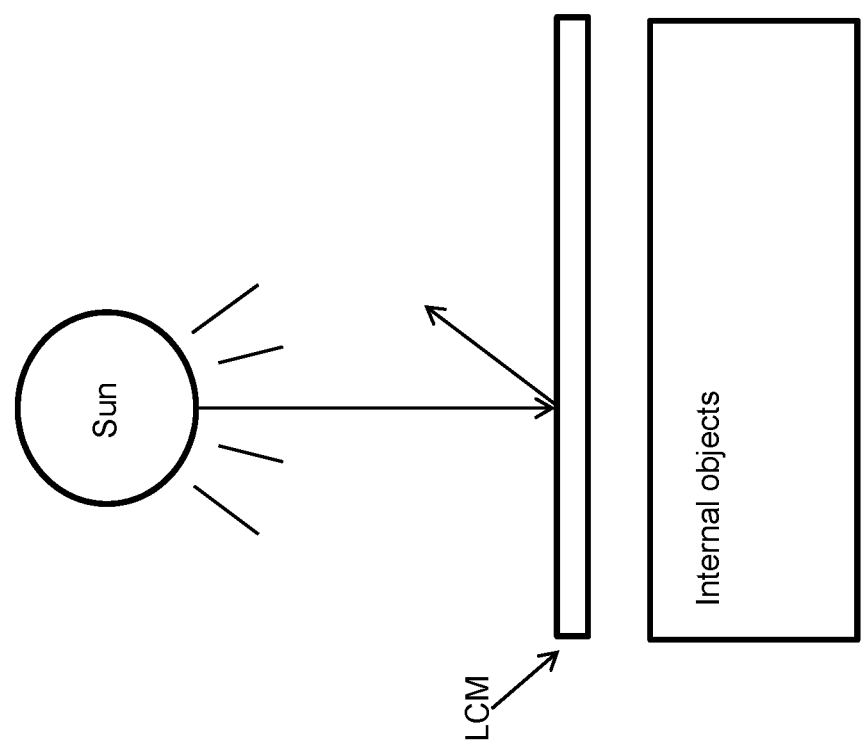
FIG. 17 is a schematic diagram illustrating high temperature resonance at shorter wavelengths to reflect sunlight in accordance with the proposed solution.

Therefore LC material 200 composition can be configured to exhibit the resonant (reflecting or back scattering) state which corresponds to low transmission conditions in a given temperature range in order to reflect light falling thereon as illustrated in FIG. 17, while with decrease in temperature (when, for example, the temperature of internal objects and air become lower), the resonant wavelength of the LC mixture 200 is shifted and light transmission of the SA-LCM becomes higher as illustrated in FIG. 18. For example, the temperature dependence of the LC material 200 composition of the SA-LCM can be used to adjust the LCM in a way to have high reflectivity and back scattering at high temperatures to limit the energy penetration into the building, say at green wavelengths (resonance range), while a reduction in temperature would shift the resonant wavelength zone into the infra red range to reflect light coming from the interior to preserve the energy in the room. The effect is reversible and self-adjusting.

Figure 19:
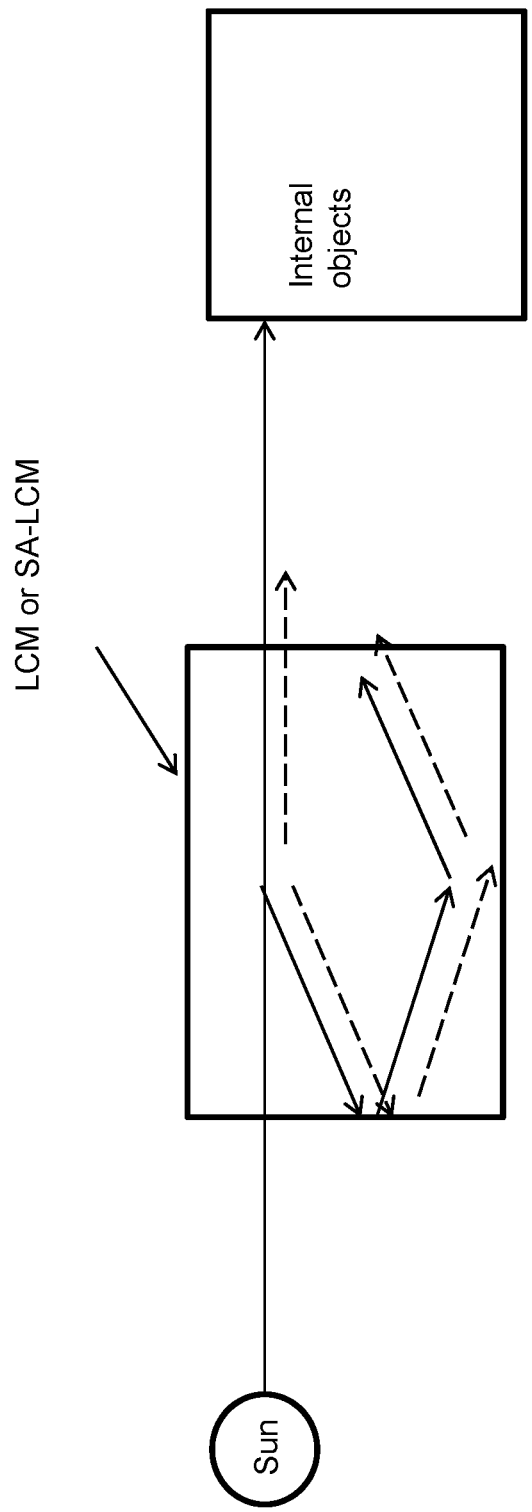
FIG. 19 is a schematic diagram illustrating wavelength conversion in a window pane in accordance with the proposed solution.
Figure 20A:
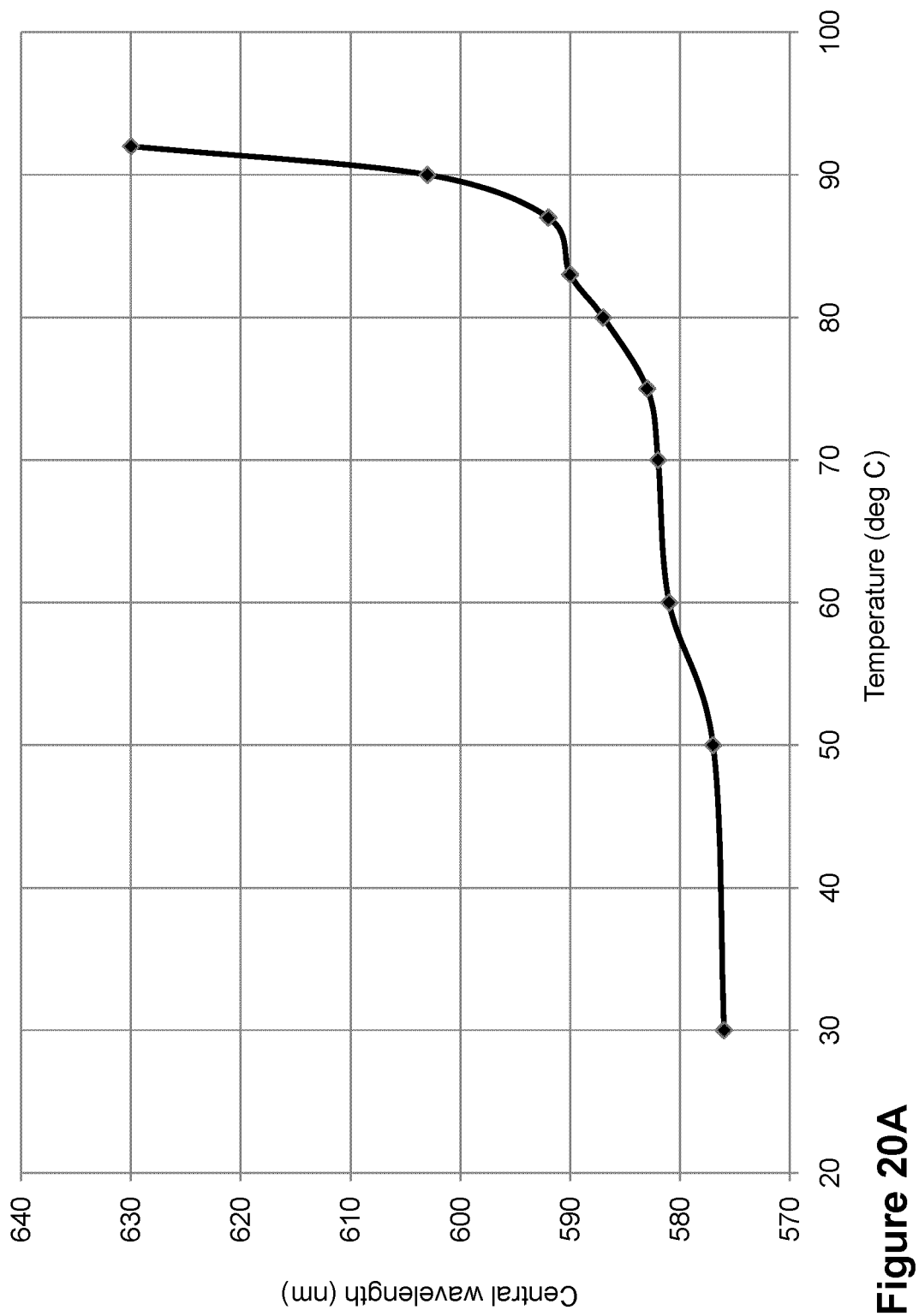
FIG. 20A is a plot illustrating the variance of the cholesteric resonance of MDA-02-3211 with temperature.
Figure 20B:
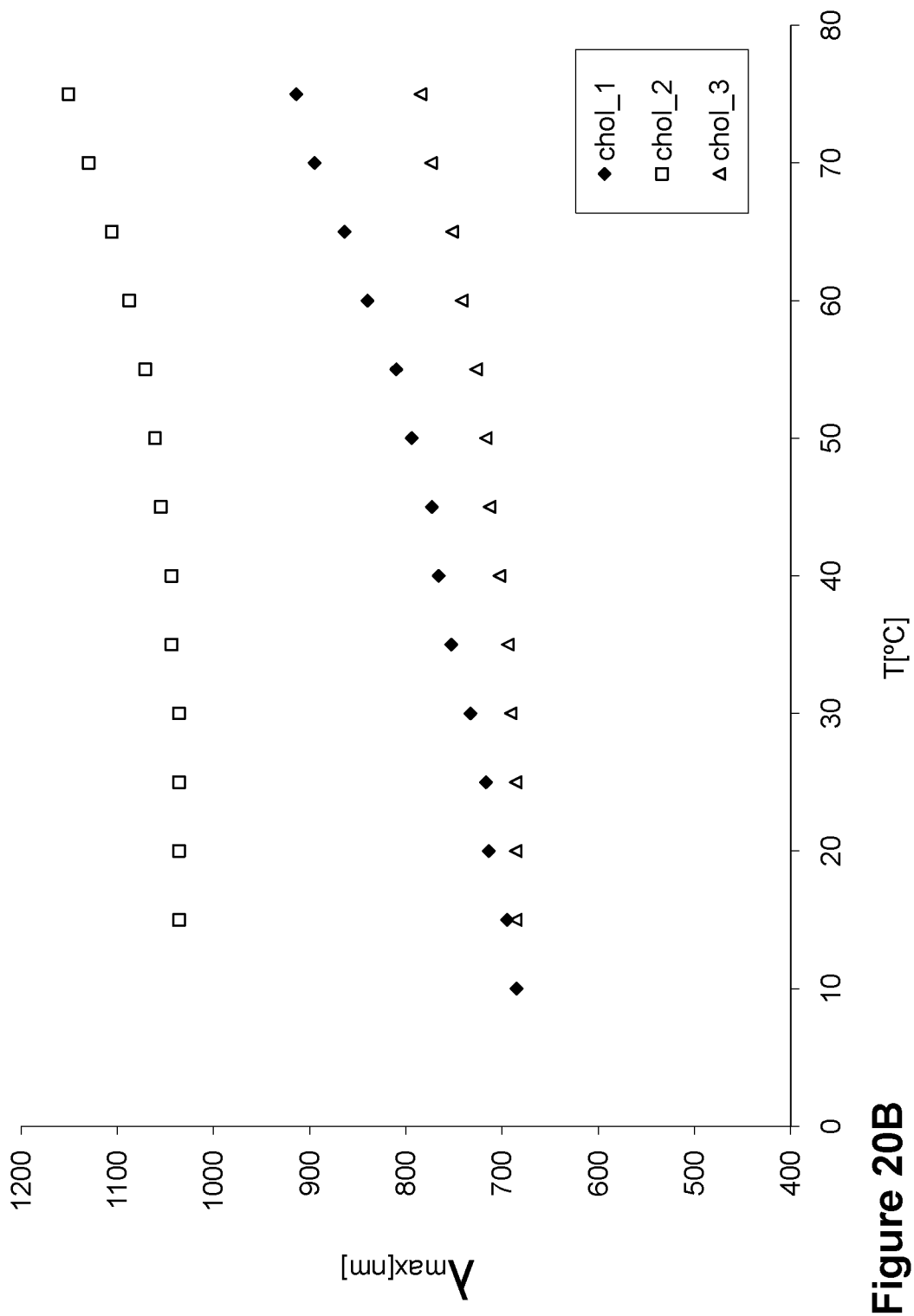
FIG. 20B is another plot illustrating the variance of the cholesteric resonance of cholesteric compounds.

In still another embodiment light sensitive dyes can be added which can absorb light and introduce a specific shift of the resonance either by creating temperature changes or by transforming themselves (such as, for example, trans to cis isomerization) which will then shift the resonance spectral position of the cholesteric LC 200 used. Both of the proposed liquid crystal modulator devices (LCM and SA-LCM) can be used in conjunction with wavelength conversion elements (dyes, metal or other nano particles, etc.) to also increase the efficiency of the wavelength conversion of light for energy control, agricultural and photo voltaic applications. Namely, the energy conversion is done during the crossing (by light) of a given thickness of the host (LC) material where the above mentioned elements are introduced their (pane) fabrication. If the host (LC) material 200 is composed (entirely or partially) from above mentioned helical structures, then certain wavelengths of light (in a range/band) can have higher efficient trajectories in the (LC) material 200 because of multiple reflections from the helical structures as illustrated in FIG. 19. For example FIG. 20A illustrates temperature dependence of the cholesteric resonance of (LC material 200) MDA-02-3211, and for other cholesteric compounds in FIG. 20B.

Figure 21:
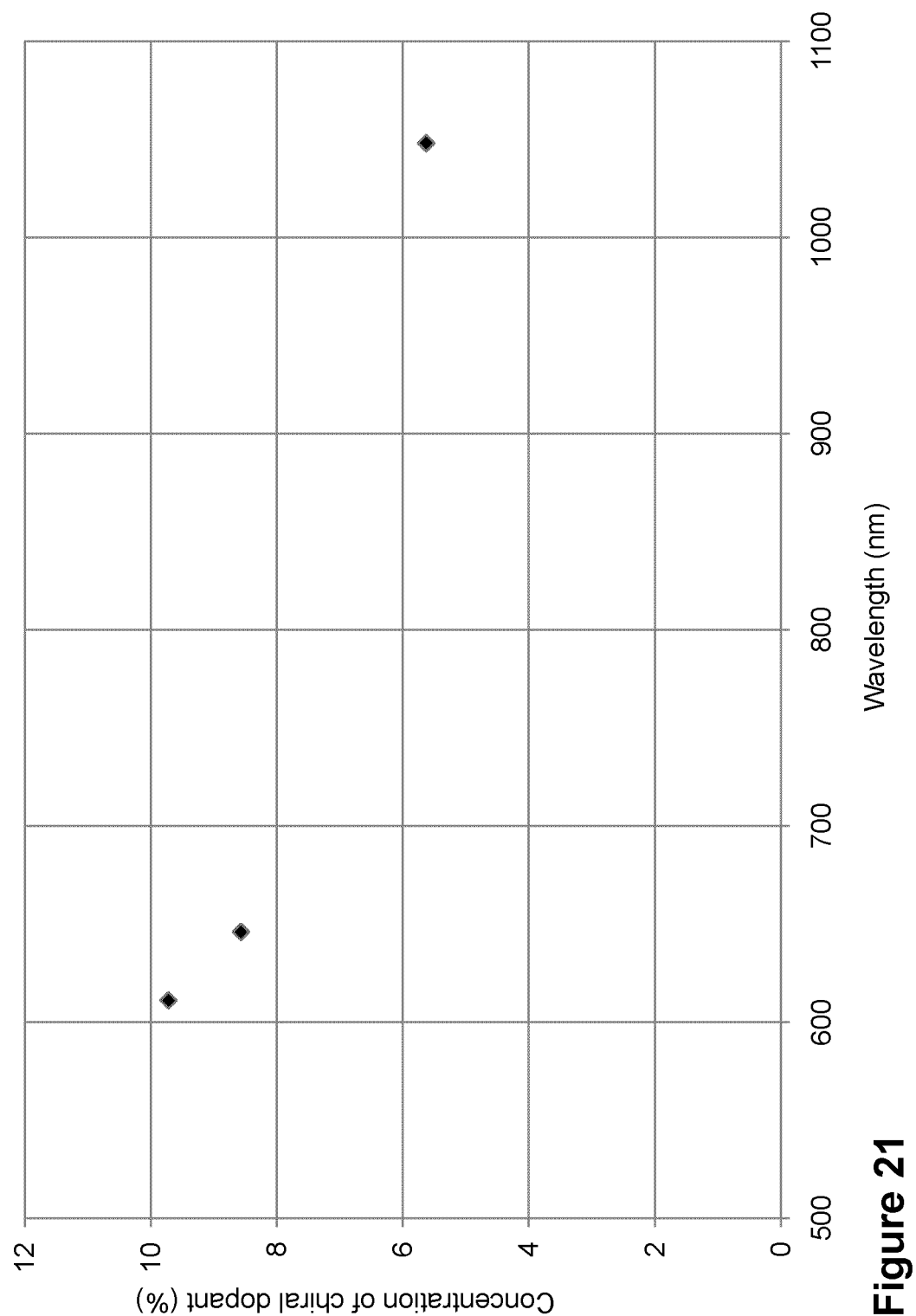
FIG. 21 is a plot illustrating the variance of the resonance wavelength with chiral dopant concentration.

FIG. 21 illustrates the variance of the resonance wavelength with chiral dopant concentration.

In the above, reference has been made to "index matched layers". By index matched layers, for example in the case of patterned transparent electrodes 101 (such as ITOs) or in the case of the isolating layer 107/106 (such as SiO2), the following can be included:

The uniform layer 102/103 in question is coated on several dielectric layers and additional dielectric layers are coated on the top of the layer. The thicknesses and refractive indexes of those dielectric layers are chosen in a way to "interferentially" cancel the back reflection of light from the layer and ultimately from the entire stack of coated layers.

Figure 22A:
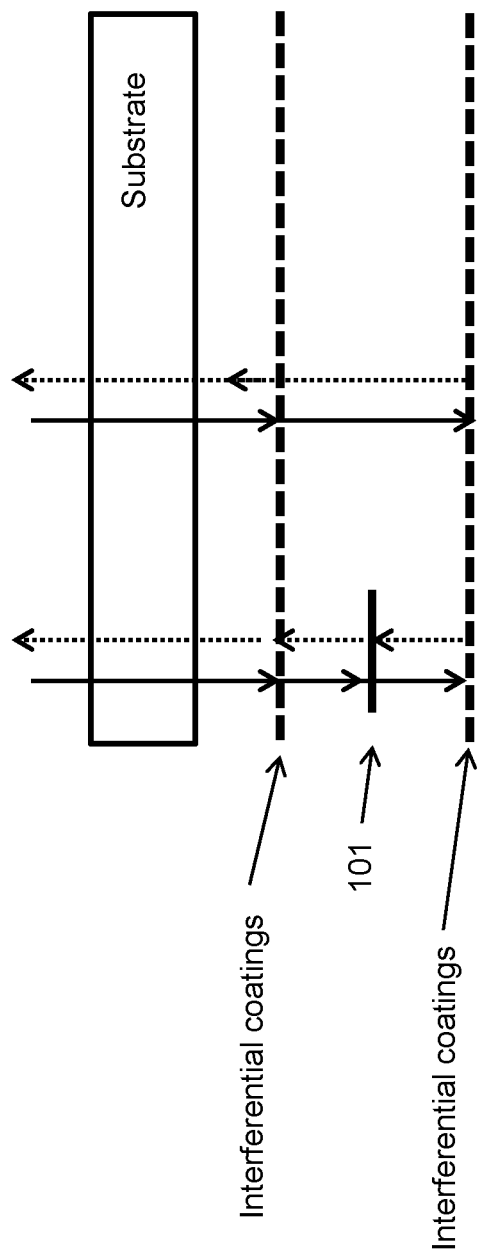
FIG. 22A is a schematic diagram illustrating interferential coatings cancelling back reflection irrespective of the presence of a non-uniform layer in accordance with the proposed solution.

The non-uniform layer 101 in question is coated as described above, but additional dielectric layers are configured and coated in a way that the interferential cancelling of the back reflection is achieved on different areas of the non-uniform layer irrespective of the presence of the non-uniform layer for example as illustrated in FIG. 22A.

Figure 22B:
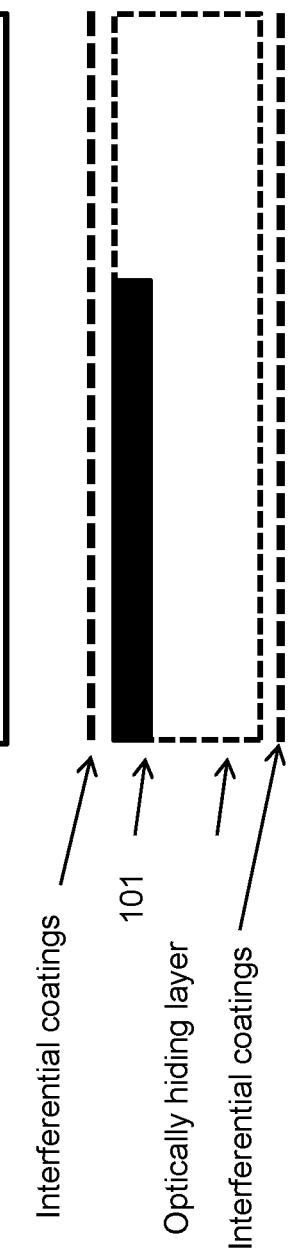
FIG. 22B is a schematic diagram illustrating interferential coatings canceling back reflection by employing a hiding layer in accordance with the proposed solution.

The non-uniform layer 101 in question is coated on the substrate directly on several dielectric layers, but the refractive index of the non-uniform layer is chosen in a way to "hide" its non-uniformities by the next layer (coated on the immediate top of the non-uniform layer) having the same refractive index. Further dielectric layers can be coated on the top of the "hiding" layer to improve the efficiency by interferential cancelling for example as illustrated in FIG. 22B.

Figure 25:
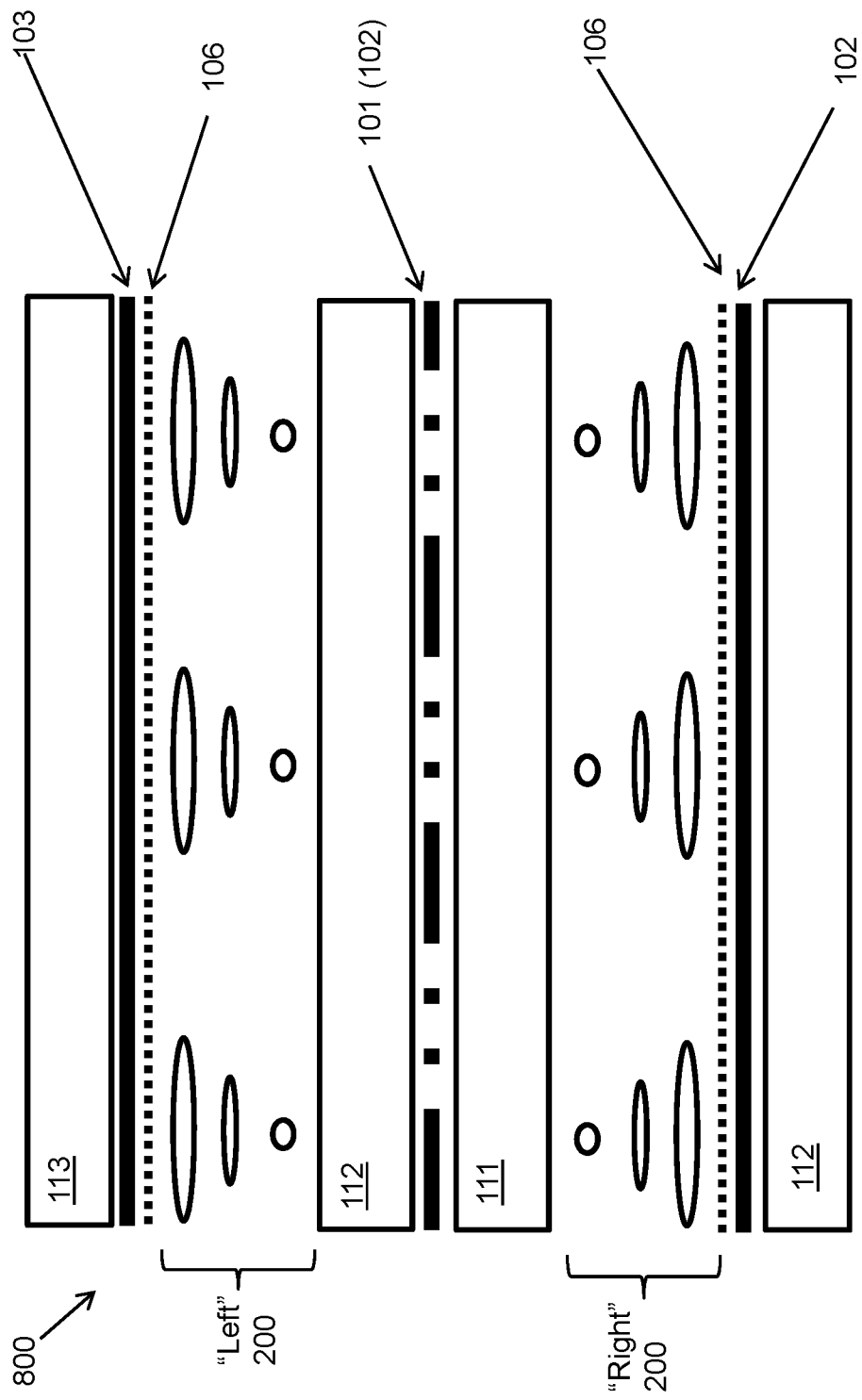
FIG. 25 is a schematic diagram illustrating a high modulation depth layered structure in accordance with the proposed solution.

In applications which require high modulation depths, double liquid crystal layers 200 with opposed circularity can be employed. The simplest layered geometry could include two similar layer sandwiches 700 which contain two LC layers 200 of opposed (circularity) helicity attached together. Such layered construction provides an improvement in providing low voltage driven modulators (shutters, windows, etc.). However, there is no need to duplicate the structure 700 of FIG. 7. Only one "combined" non-uniform electrode layer 101 (with or without index matching) can be employed in a layered geometry 800 to simplify the manufacturing process and save cost, as is illustrated in the FIG. 25.

This type of device (with a single intermediate electrode, or just duplicating the basic structure and attaching two similar sandwiches 700) can be further improved by broadening the reflection resonance, shown in the FIG. 24. Some applications, such as shutter for imaging devices, would require a specific operation mode: transparent or reflecting (preferably without forward scattering) in a relatively broad spectral band (for example, ideally between 400 nm to 700 nm or at least between 450 nm to 650 nm). One way of providing such band broadening employs in the LC material layer one helicity cholesteric (say "right") and a monomer polymerized to form a specific polymer network, then removing the cholesteric material and filling the polymer network with cholesteric LC of opposed helicity (see works by M. Mitov, N. Tabiryan, etc.)

Figure 26:
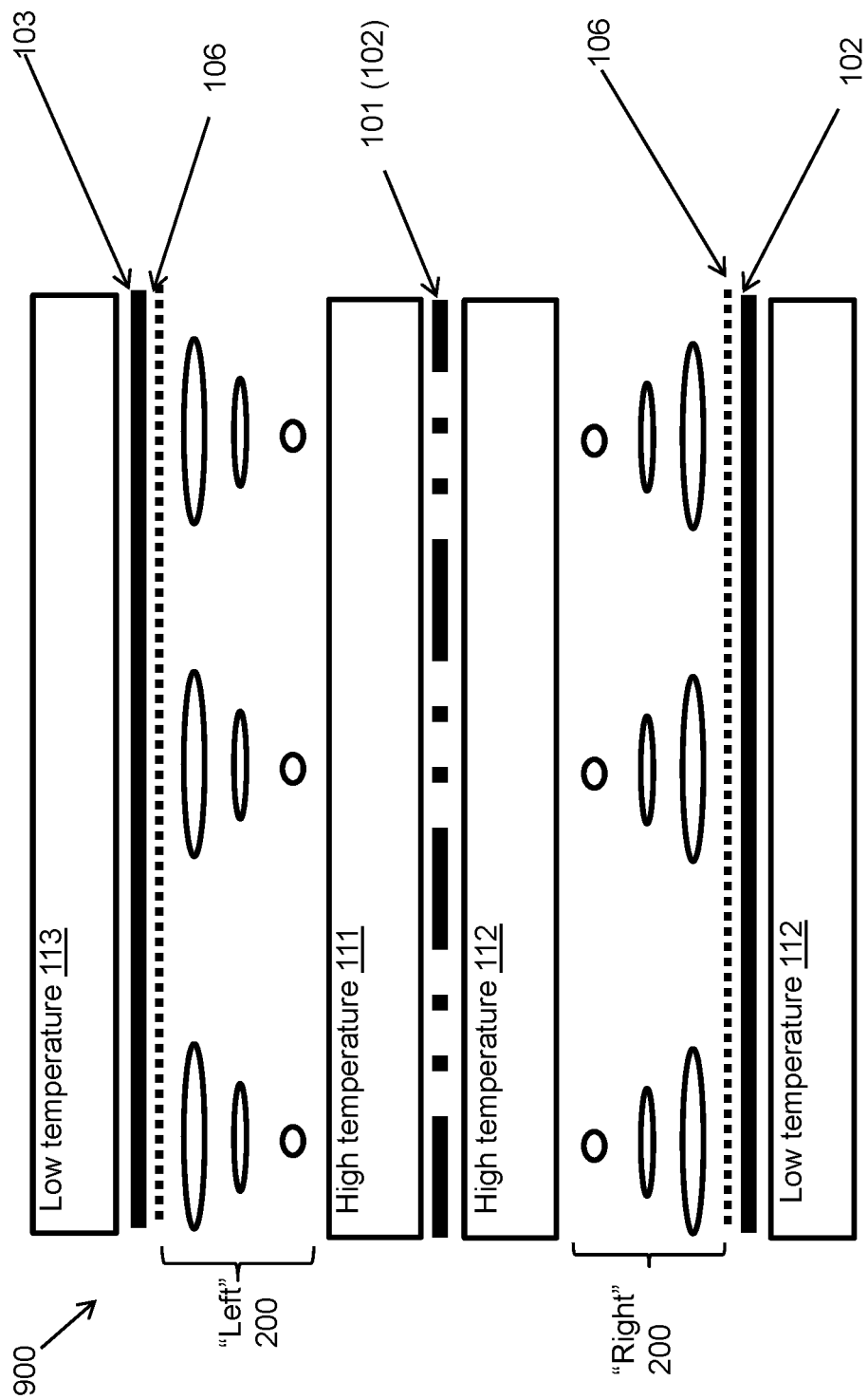
FIG. 26 is a schematic diagram illustrating a reflection bandwidth broadening layered structure in accordance with the proposed solution, wherein similar features bear similar labels throughout the drawings. While the layer sequence described is of significance, reference in the present specification to qualifiers such as "top" and "bottom" is made solely with reference to the orientation of the drawings as presented in the application and do not imply any absolute spatial orientation.

As another technique of broadening is the use of spatially varying periodicity of the helix by providing a gradient in the polymer network. Broadening of the reflection resonance can include for example (referring to FIG. 16) providing a temperature gradient as illustrated in FIG. 26 to create a chirp in the pitch of the helical structure (200), which in turn can broaden the reflection resonance.

Accordingly, LC modulators are proposed which are based on electric field generation of refractive index modulation defects without using polymer networks (PDLCs, PSLCs or S-PSLCs, etc.) or complex surface relief formation.

In accordance with yet another embodiment of the proposed solution, a split LC cell layered structure can be manufactured by inserting a broadband birefringent layer (such as a stretched Polyimide) configured to provide a half wave plate into one simple sandwich LC cell layered structure of a given cholesteric LC material 200 described hereinabove. The birefringent layer has two opposed surfaces configured to align cholesteric LC material 200 of the same circularity on either side thereof in the planar direction. For certainty, it is not necessary for the alignment on the opposed sides of the birefringent layer to be parallel to one another; uniform alignment on each side would suffice.

The principle of operation of such a layered structure causes the first front cholesteric LC layer to reflect 50% of incident natural light (namely 100% of circularly polarized light of one circularity/helicity/handedness), the remaining 50% of light the incident natural light (namely 100% of the remaining circularly polarized light of the opposed circularity) is transformed into the opposed circularity as it propagates through the second birefringent layer (the half wave plate). The incident light having passed through the half wave plate birefringence layer is then reflected by the second back layer of cholesteric LC material (of the same helicity as the first cholesteric LC layer). The light reflected by the back cholesteric LC layer is transformed again into the original circularity by propagating through the half wave plate birefringent layer a second time, and then passes substantially unchanged through the first front cholesteric LC layer.

In accordance with some implementations, the birefringent layer (substrate) can be covered with an ITO layer for heating the central layer region (part) of this split LC cell (as illustrated in FIG. 26) creating a gradient of temperature and a corresponding pitch of the helix of the cholesteric LC. The temperature gradient broadens the reflection spectra from a typical 50 nm preferably up to 150 nm, to cover a wavelength range, for example from 400 nm to 650 nm. Such a layered structure 900 can provide a shutter for miniature cameras (for example by unwinding the helix structures as descried hereinabove). For certainty, the birefringent layer is not limited to a half wave retarder plate, the birefringent layer can be configured to retard an odd number of half waves.

While the invention has been shown and described with reference to preferred embodiments thereof, it will be recognized by those skilled in the art that various changes in form and detail may be made therein without departing from the spirit and scope of the invention as defined by the appended claims.

What is claimed is:

1. A liquid crystal modulator for modulating incident light, the modulator comprising:
   two substrates;
   a cholesteric Liquid Crystal (CLC) material contained by said substrates and having a helically ordered LC molecular orientation in a ground state;
   at least one non-uniform electrode arranged on at least one of said substrates;
   an outer uniform electrode arranged on one of said substrates; and
   an opposed uniform electrode arranged on another of said substrates;
   wherein said outer uniform electrode is separated from said non-uniform electrode by an insulator, and
   wherein said CLC material has at least three states:
      the helically ordered ground state for reflection;
      a non-uniform ordered state for light dispersion when a voltage is applied between the non-uniform electrode and the opposed uniform electrode; and
      a uniform ordered state for a uniform transparent state when a voltage is applied between the outer uniform electrode and the opposed uniform electrode.

2. The modulator of claim 1, further comprising a drive circuit connected to said at least one electrode layer and configured to provide at least one drive signal for controlling said LC material to be in one of said states.

3. The modulator of claim 1, wherein said electrode layer is rubbed to provide alignment for said CLC, said CLC being aligned in a ground state to be in said reflection state.

4. The modulator of claim 1, wherein said electrode layer is covered by an alignment layer mechanically rubbed to provide alignment for said CLC, said CLC being aligned in a ground state to be in said reflection state.

5. The modulator of claim 4, comprising first and second alignment layers that are mechanically rubbed to provide alignment along in the same line.

6. The modulator of claim 1, wherein said modulator comprises two layers of said CLC material contained by at least three substrates, wherein said modulator is polarization independent.

7. The modulator of claim 1, wherein said electrode layer comprises chaotically distributed holes therein.

8. The modulator of claim 1, wherein said electrode layer comprises a directional hole pattern therein.

9. The modulator of claim 1, wherein said electrode layer comprises a transparent electrode having a stripe pattern.

10. The modulator of claim 1, wherein said CLC material comprises a cholesteric LC material of a first helicity, further comprising polymeric matrix set in the presence of said cholesteric LC material of a second opposite helicity.

11. The modulator of claim 10, comprising a temperature gradient structure providing a chirp in the pitch of the helical structure of said cholesteric LC material.

12. The modulator of claim 1, wherein said CLC includes a dichroic dopant that is aligned with a director of said CLC for absorption in a specific spectral range that is variable with an orientation of said CLC.

13. The modulator of claim 12, wherein said dopants are selected to absorbing light to generate a variation of temperature and thus shift the resonant wavelength of reflection, thus providing thus a self-adjustable modulator.

14. The modulator of claim 1, wherein said CLC is a dual frequency CLC material, and a different scattering, broadening or steering of light is achieved using a frequency below a critical frequency and using a frequency above a critical frequency.

15. A liquid crystal modulator comprising:
   at least one liquid crystal cell having substrates containing a cholesteric liquid crystal material;
   an outer uniform transparent electrode on a first one of said substrates;
   an insulation layer on said outer electrode;
   a non-uniform, patterned, electrode on said insulation layer;
   an opposed uniform transparent electrode on a second one of said substrates;
   wherein a voltage applied between said outer uniform electrode and said opposed uniform electrode with said non-uniform electrode floating provides a uniform electric field to create a uniform alignment of said liquid crystal material, and a voltage of less than ten volts applied between said non-uniform electrode and said opposed uniform electrode creates a pattern of non-uniform electric fields to create a pattern of variable liquid crystal material alignment and consequently dispersion of light.

16. A modulator as claimed in claim 15, wherein said opposed electrode is segmented and controlled by more than one voltage to provide additional control with the help of the outer uniform electrode and said non uniform electrode over the electric field providing light broadening and steering functions and fast transitions back to the uniform alignment without broadening or steering.

* * * * *